(12) United States Patent
Sandstrom

(10) Patent No.: US 10,310,901 B2
(45) Date of Patent: *Jun. 4, 2019

(54) SYSTEM AND METHOD FOR INPUT DATA LOAD ADAPTIVE PARALLEL PROCESSING

(71) Applicant: Mark Henrik Sandstrom, Helsinki (FI)

(72) Inventor: Mark Henrik Sandstrom, Helsinki (FI)

(*) Notice: Subject to any disclaimer, the term of this patent is extended or adjusted under 35 U.S.C. 154(b) by 0 days.

This patent is subject to a terminal disclaimer.

(21) Appl. No.: 16/145,632

(22) Filed: Sep. 28, 2018

(65) Prior Publication Data

US 2019/0026153 A1    Jan. 24, 2019

Related U.S. Application Data

(60) Continuation of application No. 16/014,674, filed on Jun. 21, 2018, now Pat. No. 10,133,600, which is a
(Continued)

(51) Int. Cl.
*G06F 9/46* (2006.01)
*G06F 9/50* (2006.01)
(Continued)

(52) U.S. Cl.
CPC .......... *G06F 9/5011* (2013.01); *G06F 9/4881* (2013.01); *G06F 9/546* (2013.01)

(58) Field of Classification Search
None
See application file for complete search history.

(56) References Cited

U.S. PATENT DOCUMENTS

| 4,402,046 A | 8/1983 | Cox et al. |
|---|---|---|
| 4,404,628 A | 9/1983 | Angelo |

(Continued)

FOREIGN PATENT DOCUMENTS

| DE | 3340123 A1 | 5/1985 |
|---|---|---|
| EP | 0255857 A2 | 2/1988 |

(Continued)

OTHER PUBLICATIONS

Han, Wei, et al., Multi-core Architectures with Dynamically Reconfigurable Array Processors for the WiMAx Physical layer, pp. 115-120, 2008.

(Continued)

*Primary Examiner* — Bing Zhao
(74) *Attorney, Agent, or Firm* — Gardella Grace P.A.

(57) ABSTRACT

Systems and methods provide an extensible, multi-stage, realtime application program processing load adaptive, manycore data processing architecture shared dynamically among instances of parallelized and pipelined application software programs, according to processing load variations of said programs and their tasks and instances, as well as contractual policies. The invented techniques provide, at the same time, both application software development productivity, through presenting for software a simple, virtual static view of the actually dynamically allocated and assigned processing hardware resources, together with high program runtime performance, through scalable pipelined and parallelized program execution with minimized overhead, as well as high resource efficiency, through adaptively optimized processing resource allocation.

21 Claims, 10 Drawing Sheets

Related U.S. Application Data continuation of application No. 14/521,490, filed on Oct. 23, 2014, which is a continuation of application No. 13/297,455, filed on Nov. 16, 2011, now abandoned, and a continuation of application No. 15/933,724, filed on Mar. 23, 2018, now Pat. No. 10,061,615, which is a continuation of application No. 15/273,731, filed on Sep. 23, 2016, which is a continuation of application No. 15/183,860, filed on Jun. 16, 2016, now Pat. No. 9,465,667, which is a division of application No. 15/042,159, filed on Feb. 12, 2016, now Pat. No. 9,400,694, which is a continuation of application No. 14/261,384, filed on Apr. 24, 2014, now Pat. No. 9,262,204, which is a continuation of application No. 13/684,473, filed on Nov. 23, 2012, now Pat. No. 8,789,065.

(60) Provisional application No. 61/556,065, filed on Nov. 4, 2011, provisional application No. 61/657,708, filed on Jun. 8, 2012, provisional application No. 61/673,725, filed on Jul. 19, 2012, provisional application No. 61/721,686, filed on Nov. 2, 2012, provisional application No. 61/727,372, filed on Nov. 16, 2012.

(51) Int. Cl.
*G06F 9/54* (2006.01)
*G06F 9/48* (2006.01)

(56) References Cited

U.S. PATENT DOCUMENTS

| | | | |
|---|---|---|---|
| 4,956,771 | A | 9/1990 | Neustaedter |
| 5,031,146 | A | 7/1991 | Umina et al. |
| 5,237,673 | A | 8/1993 | Orbits et al. |
| 5,303,369 | A | 4/1994 | Borcherding et al. |
| 5,452,231 | A | 9/1995 | Butts et al. |
| 5,519,829 | A | 5/1996 | Wilson |
| 5,612,891 | A | 3/1997 | Butts et al. |
| 5,752,030 | A | 5/1998 | Konno et al. |
| 5,809,516 | A | 9/1998 | Ukai et al. |
| 5,931,959 | A | 8/1999 | Kwiat |
| 6,072,781 | A | 6/2000 | Feeney et al. |
| 6,108,683 | A | 8/2000 | Kamada et al. |
| 6,212,544 | B1 * | 4/2001 | Borkenhagen ........ G06F 9/3009 718/103 |
| 6,289,434 | B1 | 9/2001 | Roy |
| 6,289,440 | B1 | 9/2001 | Casselman |
| 6,334,175 | B1 | 12/2001 | Chih |
| 6,345,287 | B1 | 2/2002 | Fong et al. |
| 6,353,616 | B1 | 3/2002 | Elwalid et al. |
| 6,366,157 | B1 | 4/2002 | Abdesselem et al. |
| 6,721,948 | B1 | 4/2004 | Morgan |
| 6,769,017 | B1 | 7/2004 | Bhat et al. |
| 6,782,410 | B1 | 8/2004 | Bhagat et al. |
| 6,816,905 | B1 | 11/2004 | Sheets et al. |
| 6,912,706 | B1 | 6/2005 | Stamm et al. |
| 7,058,868 | B2 | 6/2006 | Guettaf |
| 7,093,258 | B1 | 8/2006 | Miller et al. |
| 7,099,813 | B2 | 8/2006 | Nightingale |
| 7,110,417 | B1 | 9/2006 | El-Hennawey et al. |
| 7,178,145 | B2 | 2/2007 | Bono |
| 7,328,314 | B2 | 2/2008 | Kendall et al. |
| 7,370,013 | B1 | 5/2008 | Aziz et al. |
| 7,389,403 | B1 | 6/2008 | Alpert et al. |
| 7,406,407 | B2 | 7/2008 | Larus |
| 7,447,873 | B1 | 11/2008 | Nordquist |
| 7,461,376 | B2 | 12/2008 | Geye et al. |
| 7,503,045 | B1 | 3/2009 | Aziz et al. |
| 7,518,396 | B1 | 4/2009 | Kondapalli et al. |
| 7,581,079 | B2 | 8/2009 | Pechanek |
| 7,665,092 | B1 | 2/2010 | Vengerov |
| 7,698,541 | B1 | 4/2010 | Robles |
| 7,738,496 | B1 | 6/2010 | Raza |
| 7,743,001 | B1 | 6/2010 | Vermeulen et al. |
| 7,760,625 | B2 | 7/2010 | Miyaho et al. |
| 7,765,547 | B2 | 7/2010 | Cismas et al. |
| 7,802,255 | B2 | 9/2010 | Pilkington |
| 7,805,706 | B1 | 9/2010 | Ly et al. |
| 7,861,063 | B1 | 12/2010 | Golla et al. |
| 7,908,606 | B2 | 3/2011 | Depro et al. |
| 7,984,246 | B1 | 7/2011 | Yung et al. |
| 8,001,549 | B2 | 8/2011 | Henmi |
| 8,015,392 | B2 | 9/2011 | Naik et al. |
| 8,018,961 | B2 | 9/2011 | Gopinath et al. |
| 8,024,731 | B1 * | 9/2011 | Cornwell ............ G06F 9/4881 718/100 |
| 8,032,889 | B2 | 10/2011 | Conrad et al. |
| 8,046,766 | B2 | 10/2011 | Rhine |
| 8,059,674 | B2 | 11/2011 | Cheung et al. |
| 8,060,610 | B1 | 11/2011 | Herington |
| 8,087,029 | B1 | 12/2011 | Lindholm et al. |
| 8,095,662 | B1 | 1/2012 | Lappas et al. |
| 8,098,255 | B2 | 1/2012 | Fouladi et al. |
| 8,230,070 | B2 | 7/2012 | Buyya et al. |
| 8,271,730 | B2 | 9/2012 | Piry et al. |
| 8,327,126 | B2 | 12/2012 | Bell, Jr. et al. |
| 8,352,611 | B2 | 1/2013 | Maddhuri et al. |
| 8,429,630 | B2 | 4/2013 | Nickolov et al. |
| 8,447,933 | B2 | 5/2013 | Nishihara |
| 8,533,674 | B2 | 9/2013 | Abrams et al. |
| 8,539,207 | B1 | 9/2013 | LeGrand |
| 8,566,836 | B2 | 10/2013 | Ramaraju et al. |
| 8,713,572 | B2 | 4/2014 | Chambliss et al. |
| 8,713,574 | B2 | 4/2014 | Creamer et al. |
| 8,745,241 | B2 | 6/2014 | Waldspurger |
| 9,348,724 | B2 | 5/2016 | Ota et al. |
| 9,448,847 | B2 | 9/2016 | Sandstrom |
| 9,608,933 | B2 | 3/2017 | Emaru |
| 2002/0040400 | A1 | 4/2002 | Masters |
| 2002/0056033 | A1 | 5/2002 | Huppenthal |
| 2002/0112091 | A1 | 8/2002 | Schott et al. |
| 2002/0124012 | A1 | 9/2002 | Liem et al. |
| 2002/0129080 | A1 | 9/2002 | Hentschel et al. |
| 2002/0141343 | A1 | 10/2002 | Bays |
| 2002/0143843 | A1 | 10/2002 | Mehta |
| 2002/0169828 | A1 | 11/2002 | Blanchard |
| 2003/0018807 | A1 | 1/2003 | Larsson et al. |
| 2003/0235200 | A1 | 12/2003 | Kendall et al. |
| 2004/0088488 | A1 | 5/2004 | Ober et al. |
| 2004/0111724 | A1 | 6/2004 | Libby |
| 2004/0128401 | A1 | 7/2004 | Fallon et al. |
| 2004/0158637 | A1 | 8/2004 | Lee |
| 2004/0168170 | A1 | 8/2004 | Miller |
| 2004/0193806 | A1 | 9/2004 | Koga et al. |
| 2004/0210900 | A1 | 10/2004 | Jones et al. |
| 2005/0010502 | A1 | 1/2005 | Birkestrand et al. |
| 2005/0013705 | A1 | 1/2005 | Farkas et al. |
| 2005/0036515 | A1 | 2/2005 | Cheung et al. |
| 2005/0055694 | A1 | 3/2005 | Lee |
| 2005/0080999 | A1 | 4/2005 | Angsmark et al. |
| 2005/0182838 | A1 | 8/2005 | Sheets et al. |
| 2005/0188372 | A1 | 8/2005 | Inoue et al. |
| 2005/0193186 | A1 | 9/2005 | Gazsi et al. |
| 2005/0198476 | A1 | 9/2005 | Gazsi et al. |
| 2005/0235070 | A1 | 10/2005 | Young et al. |
| 2005/0268298 | A1 | 12/2005 | Hunt et al. |
| 2005/0278551 | A1 | 12/2005 | Goodnow et al. |
| 2006/0036774 | A1 | 2/2006 | Schott et al. |
| 2006/0059485 | A1 | 3/2006 | Onufryk et al. |
| 2006/0061794 | A1 | 3/2006 | Ito et al. |
| 2006/0070078 | A1 | 3/2006 | Dweck et al. |
| 2006/0075265 | A1 | 4/2006 | Hamaoka et al. |
| 2006/0179194 | A1 | 8/2006 | Jensen |
| 2006/0195847 | A1 | 8/2006 | Amano et al. |
| 2006/0218376 | A1 | 9/2006 | Pechanek |
| 2007/0074011 | A1 | 3/2007 | Borkar et al. |
| 2007/0153802 | A1 | 7/2007 | Anke et al. |
| 2007/0220517 | A1 | 9/2007 | Lippett |
| 2007/0226482 | A1 | 9/2007 | Borkar et al. |
| 2007/0291576 | A1 | 12/2007 | Yang |

(56) References Cited

U.S. PATENT DOCUMENTS

| | | |
|---|---|---|
| 2008/0077927 A1 | 3/2008 | Armstrong et al. |
| 2008/0086395 A1 | 4/2008 | Brenner et al. |
| 2008/0189703 A1 | 8/2008 | Im et al. |
| 2008/0244588 A1 | 10/2008 | Leiserson et al. |
| 2008/0256339 A1 | 10/2008 | Xu et al. |
| 2009/0037554 A1 | 2/2009 | Herington |
| 2009/0049443 A1 | 2/2009 | Powers et al. |
| 2009/0070762 A1 | 3/2009 | Franaszek et al. |
| 2009/0178047 A1 | 7/2009 | Astley et al. |
| 2009/0187756 A1 | 7/2009 | Nollet et al. |
| 2009/0198866 A1 | 8/2009 | Chen et al. |
| 2009/0265712 A1 | 10/2009 | Herington |
| 2009/0327446 A1 | 12/2009 | Wittenschlaeger |
| 2010/0043008 A1 | 2/2010 | Marchand |
| 2010/0049963 A1 | 2/2010 | Bell, Jr. et al. |
| 2010/0058346 A1 | 3/2010 | Narang et al. |
| 2010/0100883 A1 | 4/2010 | Booton |
| 2010/0131955 A1 | 5/2010 | Brent et al. |
| 2010/0153700 A1 | 6/2010 | Capps, Jr. et al. |
| 2010/0153955 A1 | 6/2010 | Sirota et al. |
| 2010/0162230 A1 | 6/2010 | Chen et al. |
| 2010/0192155 A1 | 7/2010 | Nam et al. |
| 2010/0205602 A1 | 8/2010 | Zedlewski et al. |
| 2010/0232396 A1 | 9/2010 | Jing et al. |
| 2010/0268889 A1 | 10/2010 | Conte et al. |
| 2010/0287320 A1 | 11/2010 | Querol et al. |
| 2011/0014893 A1 | 1/2011 | Davis et al. |
| 2011/0035749 A1 | 2/2011 | Krishnakumar et al. |
| 2011/0050713 A1 | 3/2011 | McCrary et al. |
| 2011/0055480 A1 | 3/2011 | Guyetant et al. |
| 2011/0096667 A1 | 4/2011 | Arita et al. |
| 2011/0119674 A1 | 5/2011 | Nishikawa |
| 2011/0154348 A1 | 6/2011 | Elnozahy et al. |
| 2011/0161969 A1 | 6/2011 | Arndt et al. |
| 2011/0173432 A1 | 7/2011 | Cher et al. |
| 2011/0197048 A1 | 8/2011 | Chung et al. |
| 2011/0247012 A1 | 10/2011 | Uehara |
| 2011/0249678 A1 | 10/2011 | Bonicatto et al. |
| 2011/0258317 A1 | 10/2011 | Sinha et al. |
| 2011/0296138 A1 | 12/2011 | Carter et al. |
| 2011/0321057 A1 | 12/2011 | Mejdrich et al. |
| 2012/0022832 A1 | 1/2012 | Shannon et al. |
| 2012/0079501 A1 | 3/2012 | Sandstrom |
| 2012/0089985 A1 | 4/2012 | Adar et al. |
| 2012/0173734 A1 | 7/2012 | Kimbrel et al. |
| 2012/0216012 A1 | 8/2012 | Vorbach et al. |
| 2012/0221886 A1 | 8/2012 | Barsness et al. |
| 2012/0222038 A1 | 8/2012 | Katragadda et al. |
| 2012/0222042 A1 | 8/2012 | Chess et al. |
| 2012/0266176 A1 | 10/2012 | Vojnovic et al. |
| 2012/0303809 A1 | 11/2012 | Patel et al. |
| 2012/0324458 A1 | 12/2012 | Peterson et al. |
| 2013/0013903 A1 | 1/2013 | Bell, Jr. et al. |
| 2013/0222402 A1 | 8/2013 | Peterson et al. |
| 2014/0123135 A1 | 5/2014 | Huang et al. |
| 2014/0181501 A1 | 6/2014 | Hicok et al. |
| 2014/0317378 A1 | 10/2014 | Lippett |
| 2014/0331236 A1 | 11/2014 | Mitra et al. |
| 2015/0178116 A1 | 6/2015 | Jorgensen et al. |
| 2015/0339798 A1 | 11/2015 | Peterson et al. |
| 2015/0378776 A1 | 12/2015 | Lippett |
| 2016/0048394 A1 | 2/2016 | Vorbach et al. |
| 2016/0080201 A1 | 3/2016 | Huang et al. |
| 2016/0378538 A1 | 12/2016 | Kang |
| 2017/0097838 A1 | 4/2017 | Nagapudi et al. |

FOREIGN PATENT DOCUMENTS

| | | |
|---|---|---|
| EP | 0889622 A2 | 7/1999 |
| EP | 2309388 A1 | 4/2011 |
| GB | 1236177 A | 6/1971 |
| GB | 2145255 A | 3/1985 |
| GB | 2272311 A | 5/1994 |
| JP | 05197619 A | 8/1993 |
| JP | 06004314 A | 1/1994 |
| JP | 11353291 A | 12/1999 |
| SU | 1327106 A1 | 7/1987 |
| WO | 2000070426 A2 | 11/2000 |
| WO | 2011123467 A1 | 10/2011 |

OTHER PUBLICATIONS

Jean, J et al., Dynamic reconfirmation to support concurrent applications, IEEE Transactions on Computers, vol. 48, Issue 6, pp. 591-602, Jun. 1999.

Loh, Gabriel H., 3 D-Stacked Memory Architectures for Multi-Core Processors, IEEE Computer Society, pp. 453-464, 2008.

McCan, Cathy, et al., A Dynamic Processor Allocation Policy for Multiprogrammed Shared-Memory Multiprocessors, 1993, ACM, 33 pages (146-178).

Ismail, M. I., et al., "Program-based static allocation policies for highly parallel computers," Proceedings International Phoenix Conference on Computers and Communications, Scottsdale, AZ, 1995, pp. 61-68.

Morishita, et al., Design of a multiprocessor system supporting interprocess message communication, Journal of the Faculty of Engineering, University of Tokyo, Series A, No. 24, 1986, pp. 36-37.

Hindman, Benjamin, et al., Mesos: A Platform for Fine-Grained Resource Sharing in the Data Center, Proceedings of NSDI '11: 8th USENIX Symposium on Networked Systems Design and Implementation, Mar. 30, 2011, pp. 295-308.

Murthy, Arun C., et al., Architecture of Next Generation Apache Hadoop MapReduce Framework, 2011, 14 pages.

Shieh, Alan, et al., Sharing the Data Center Network, Proceedings of NSDI '11: 8th USENIX Symposium on Networked Systems Design and Implementation, Mar. 30, 2011, pp. 309-322.

[#HADOOP-3445] Implementing core scheduler functionality in Resource Manager (V1) for Hadoop, Accessed May 18, 2018, 12 pages, https://issues.apache.org/jira/si/jira.issueviews:issue-html/HADOOP-3445/HADOOP-3445.html.

Zaharia, Matei et al., Job Scheduling for Multi-User MapReduce Clusters, Apr. 30, 2009, actual publication date unknown,18 pages, Electrical Engineering and Computer Sciences, University of California at Berkeley, https://www2.eecs.berkeley.edu/Pubs/TechRpts/2009/EECS-2009-55.pdf.

Isard, Michael et al., Quincy: Fair Scheduling for Distributed Computing Clusters, Accessed May 18, 2018, 20 pages, https://www.sigops.org/sosp/sosp09/papers/isard-sosp09.pdf.

Tsai, Chang-Hao, System Architectures with Virtualized Resources in a Large-Scale Computing Infrastructure, 2009, 146 pages, Computer Science and Engineering, The University of Michigan, https://kabru.eecs.umich.edu/papers/thesis/chtsai-thesis.pdf.

Sandholm, Thomas et al., Dynamic Proportional Share Scheduling in Hadoop, Accessed May 18, 2018, 20 pages, Hewlett-Packard Laboratories, http://citeseerx.ist.psu.edu/viewdoc/download?doi=10.1.1.591.4477&rep=rep1&type=pdf.

Mohan, Shiwali et al., Towards a Resource Aware Scheduler in Hadoop, Dec. 21, 2009, 10 pages, Computer Science and Engineering, University of Michigan, Ann Arbor, https://pdfs.semanticscholar.org/d2e3/c7b60967934903f0837219772c6972ede93e.pdf.

Tian, Chao et al., A Dynamic MapReduce Scheduler for Heterogeneous Workloads, 2009, pp. 218-224, IEEE Computer Society, https://pdfs.semanticscholar.org/679f/73d810e2ac9e2e84de798d853b6fb0b0206a.pdf.

Fischer, Michael J. et al., Assigning Tasks for Efficiency in Hadoop, 2010, 11 pages, https://www.researchgate.net/profile/Xueyuan_Su/publication/221257628_Assigning_tasks_for_efficiency_in_Hadoop/links/53df31100cf216e4210c5fd1/Assigning-tasks-for-efficiency-in-Hadoop.pdf.

Cooper, Brian F. et al., Building a Cloud for Yahoo!, 2009, 9 pages, IEEE Computer Society Technical Committee on Data Engineering, https://www.researchgate.net/profile/Rodrigo_Fonseca3/publication/220282767_Building_a_Cloud_for_Yahoo/links/0912f5109da99ddf6a000000/Building-a-Cloud-for-Yahoo.pdf.

(56) References Cited

OTHER PUBLICATIONS

Lim, Harold C. et al., Automated Control in Cloud Computing: Challenges and Opportunities, Jun. 19, 2009, 6 pages, ACM, https://www2.cs.duke.edu/nicl/pub/papers/acdc09-lim.pdf.
Wen et al., "Minimizing Migration on Grid Environments: an Experience on Sun Grid Engine" Journal of Information Technology and Applications, vol. 1, No. 4, pp. 297-304 (2007).
Gentzsch, et al., "Sun Grid Engine: Towards Creating a Compute Power Grid." IEEE Computer Society, Proceedings of the 1st International Symposium on Cluster Computing and the Grid (2001).
Borges, et al., "Sun Grid Engine, a new scheduler for EGEE middleware," (2018).
Shankar, Uma, Oracle Grid Engine Administration Guide, Release 6.2 Update 7, Aug. 2011, 202 pages, Oracle Corporation.
Non-Final Rejection issued in related U.S. Appl. No. 13/297,455 dated Mar. 14, 2013, 23 pages.
Final Rejection issued in related U.S. Appl. No. 13/297,455 dated Apr. 18, 2013, 18 pages.
Non-Final Rejection issued in related U.S. Appl. No. 13/297,455 dated Jun. 19, 2014, 15 pages.
Final Rejection issued in related U.S. Appl. No. 13/297,455 dated Sep. 3, 2014, 18 pages.
Non-Final Rejection issued in related U.S. Appl. No. 13/297,455 dated Oct. 3, 2014, 29 pages.
Final Rejection issued in related U.S. Appl. No. 13/297,455 dated Mar. 26, 2015, 14 pages.
Examiner's Answer issued in related U.S. Appl. No. 13/297,455 dated Feb. 10, 2016, 9 pages.
Non-Final Rejection issued in related U.S. Appl. No. 13/684,473 dated Mar. 7, 2014, 24 pages.
Non-Final Rejection issued in related U.S. Appl. No. 14/318,512 dated Feb. 12, 2016, 25 pages.
Non-Final Rejection issued in related U.S. Appl. No. 14/318,512 dated Jun. 1, 2016, 18 pages.
Non-Final Rejection issued in related U.S. Appl. No. 14/521,490 dated May 4, 2017, 19 pages.
Final Rejection issued in related U.S. Appl. No. 14/521,490 dated Jul. 28, 2017, 16 pages.
Non-Final Rejection issued in related U.S. Appl. No. 14/521,490 dated May 17, 2018, 23 pages.
Non-Final Rejection issued in related U.S. Appl. No. 15/267,153 dated Mar. 9, 2018, 23 pages.
Non-Final Rejection issued in related U.S. Appl. No. 15/273,731 dated Aug. 6, 2018, 94 pages.
Ghodsi, Ali, et al., Dominant Resource Fairness: Fair Allocation of Multiple Resource Types, Proceedings of NSDI 11: 8th USENIX Symposium on Networked Systems Design and Implementation, Mar. 30, 2011, pp. 309-322.
Final Rejection issued in related U.S. Appl. No. 14/521,490 dated Nov. 14, 2018, 21 pages.
Notice of Allowance issued in related U.S. Appl. No. 16/014,658 dated Aug. 29, 2018, 22 pages.
Notice of Allowance issued in related U.S. Appl. No. 16/014,674 dated Aug. 27, 2018, 21 pages.
Partial Reconfiguration User Guide, a Xilinx, Inc. user document UG702 (v14.2) Jul. 25, 2012.
Dye, David, Partial Reconfiguration of Xilinx FPGAs Using ISE Design Suite, a Xilinx, Inc. White Paper WP374 (v1.2), May 30, 2012.
Lamonnier et al., Accelerate Partial Reconfiguration with a 100% Hardware Solution, Xcell Journal, Issue 79, Second Quarter 2012, pp. 44-49.
7 Series FPGAs Configuration User Guide, a Xilinx, Inc. User Guide UG470 (v1.4) Jul. 19, 2012.
Partial Reconfiguration Tutorial, PlanAhead Design Tool, a Xilinx, Inc. User Guide UG743 (v14.1) May 8, 2012.
Tam et al., Fast Configuration of PCI Express Technology through Partial Reconfiguration, a Xilinx, Inc. Application Note XAPP883 (v1.0) Nov. 19, 2010.
Singh, Deshanand, Implementing FPGA Design with the OpenCL Standard, an Altera Corporation White Paper WP-01173-2.0, Nov. 2012.
First Examination Report issued in IN Application No. 401/MUM/2011 dated Nov. 9, 2018.

\* cited by examiner

SYSTEM AND METHOD FOR INPUT DATA LOAD ADAPTIVE PARALLEL PROCESSING

CROSS-REFERENCE TO RELATED APPLICATIONS

This application is a continuation of U.S. application Ser. No. 16/014,674 filed Jun. 21, 2018, which is a continuation of U.S. application Ser. No. 15/933,724 filed Mar. 23, 2018, which is a continuation of U.S. application Ser. No. 15/273,731 filed Sep. 23, 2016, which is a continuation of U.S. application Ser. No. 15/183,860 filed Jun. 16, 2016 (now U.S. Pat. No. 9,465,667), which is a divisional of U.S. application Ser. No. 15/042,159 filed Feb. 12, 2016 (now U.S. Pat. No. 9,400,694), which is a continuation of U.S. application Ser. No. 14/261,384 filed Apr. 24, 2014 (now U.S. Pat. No. 9,262,204), which is a continuation of U.S. application Ser. No. 13/684,473 filed Nov. 23, 2012 (now U.S. Pat. No. 8,789,065), which claims the benefit of the following provisional applications:

[1] U.S. Provisional Application No. 61/657,708, filed Jun. 8, 2012;
[2] U.S. Provisional Application No. 61/673,725, filed Jul. 19, 2012;
[3] U.S. Provisional Application No. 61/721,686, filed Nov. 2, 2012; and
[4] U.S. Provisional Application No. 61/727,372, filed Nov. 16, 2012.

U.S. application Ser. No. 16/014,674 is also a continuation of U.S. Utility application Ser. No. 14/521,490, filed Oct. 23, 2014, which is a continuation of U.S. Utility application Ser. No. 13/297,455, filed Nov. 16, 2011, which claims the benefit of U.S. Provisional Application No. 61/556,065, filed Nov. 4, 2011.

This application is also related to the following:
[5] U.S. Utility application Ser. No. 13/184,028, filed Jul. 15, 2011;
[6] U.S. Utility application Ser. No. 13/270,194, filed Oct. 10, 2011 (now U.S. Pat. No. 8,490,111); and
[7] U.S. Utility application Ser. No. 13/277,739, filed Nov. 21, 2011 (now U.S. Pat. No. 8,561,076)

All above identified applications are hereby incorporated by reference in their entireties for all purposes.

BACKGROUND

Technical Field

This invention pertains to the field of data processing and networking, particularly to techniques for connecting tasks of parallelized programs running on multi-stage manycore processor with each other as well as with external parties with high resource efficiency and high data processing throughput rate.

Descriptions of the Related Art

Traditionally, advancements in computing technologies have fallen into two categories. First, in the field conventionally referred to as high performance computing, the main objective has been maximizing the processing speed of one given computationally intensive program running on a dedicated hardware comprising a large number of parallel processing elements. Second, in the field conventionally referred to as utility or cloud computing, the main objective has been to most efficiently share a given pool of computing hardware resources among a large number of user application programs. Thus, in effect, one branch of computing technology advancement effort has been seeking to effectively use a large number of parallel processors to accelerate execution of a single application program, while another branch of the effort has been seeking to efficiently share a single pool of computing capacity among a large number of user applications to improve the utilization of the computing resources.

However, there have not been any major synergies between these two efforts; often, pursuing any one of these traditional objectives rather happens at the expense of the other. For instance, it is clear that a practice of dedicating an entire parallel processor based (super) computer per individual application causes severely sub-optimal computing resource utilization, as much of the capacity would be idling much of the time. On the other hand, seeking to improve utilization of computing systems by sharing their processing capacity among a number of user applications using conventional technologies will cause non-deterministic and compromised performance for the individual applications, along with security concerns.

As such, the overall cost-efficiency of computing is not improving as much as any nominal improvements toward either of the two traditional objectives would imply: traditionally, single application performance maximization comes at the expense of system utilization efficiency, while overall system efficiency maximization comes at the expense of performance of by the individual application programs. There thus exists a need for a new parallel computing architecture, which, at the same time, enables increasing the speed of executing application programs, including through execution of a given application in parallel across multiple processor cores, as well as improving the utilization of the computing resources available, thereby maximizing the collective application processing throughput for a given cost budget.

Moreover, even outside traditional high performance computing, the application program performance requirements will increasingly be exceeding the processing throughput achievable from a single central processing unit (CPU) core, e.g. due to the practical limits being reached on the CPU clock rates. This creates an emerging requirement for intra-application parallel processing (at ever finer grades) also for mainstream software programs (i.e. applications not traditionally considered high performance computing). Notably, these internally parallelized mainstream enterprise and web applications will be largely deployed on dynamically shared cloud computing infrastructure. Accordingly, the emerging form of mainstream computing calls for technology innovation supporting the execution of large number of internally parallelized applications on dynamically shared resource pools, such as manycore processors.

Furthermore, conventional microprocessor and computer system architectures use significant portions of their computation capacity (e.g. CPU cycles or core capacity of manycore arrays) for handling input and output (TO) communications to get data transferred between a given processor system and external sources or destinations as well as between different stages of processing within the given system. For data volume intensive computation workloads and/or manycore processor hardware with high IO bandwidth needs, the portion of computation power spent on IO and data movements can be particularly high. To allow using maximized portion of the computing capacity of processors for processing the application programs and application data (rather than for system functions such as IO data movements), architectural innovations are also needed in the field of manycore processor IO subsystems. In particular, there is a need for a new manycore processor system data flow and IO architecture whose operation, while providing high IO data throughput performance, causes little or no overhead in terms of usage of the computation units of the processor.

SUMMARY

The invented systems and methods provide an extensible, multi-stage, application program load adaptive, parallel data processing architecture shared dynamically among a set of application software programs according to processing load variations of said programs. The invented techniques enable any program task instance to exchange data with any of the task instances of its program within the multi-stage parallel data processing platform, while allowing any of said task instances to be executing at any core of their local processors, as well allowing any identified destination task instance to be not assigned for execution by any core for periods of time, and while said task instances lack knowledge of which core, if any, at said platform is assigned for executing any of said task instances at any given time.

An aspect of the invention provides a system for information connectivity among tasks of a set of software programs hosted on a multi-stage parallel data processing platform. Such a system comprises: 1) a set of manycore processor based processing stages, each stage providing an array of processing cores, wherein each of said tasks is hosted on one of the processing stages, with tasks hosted on a given processing stage referred to as locally hosted tasks of that stage, 2) a hardware implemented data packet switching cross-connect (XC) connecting data packets from an output port of a processing stage to an input port of a given processing stage if a destination software program task of the data packet is hosted at the given processing stage, and 3) a hardware implemented receive logic subsystem, at any given one of the processing stages, connecting data packets from input ports of the given processing stage to the array of cores of that stage, so that a given data packet is connected to such a core, if any exist at a given time, among said array that is assigned at the given time to process a program instance to which the given input packet is directed to. Various embodiments of such systems further comprise features whereby: a) at a given processing stage, a hardware implemented controller i) periodically allocates the array of cores of the given stage among instances of its locally hosted tasks at least in part based on volumes of data packets connected through the XC to its locally hosted tasks and ii) accordingly inserts the identifications of the destination programs for the data packets passed from the given processing stage for switching at the XC, to provide isolation between different programs among the set; b) the system supports multiple instances of each of the locally hosted tasks at their processing stages, and packet switching through the XC to an identified instance of a given destination program task; c) said tasks are located across at least a certain subset of the processing stages so as to provide an equalized expected aggregate task processing load for each of the processing stages of said subset; and/or d) said tasks are identified with incrementing intra-program task IDs according to their descending processing load levels within a given program, wherein, among at least a subset of the processing stages, each processing stage of said subset hosts one of the tasks of each of the set programs so as to equalize sums of said task IDs of the tasks located on each of the processing stages of said subset.

An aspect of the invention further provides a method for information connectivity among tasks of a set of software programs. Such a method comprises: 1) hosting said tasks on a set of manycore processor based processing stages, each stage providing an array of processing cores, with tasks hosted on a given processing stage referred to as locally hosted tasks of that stage, 2) at a data packet switching cross-connect (XC), connecting data packets from an output port of a processing stage to an input port of a given processing stage if a destination software program task identified for a given data packet is hosted at the given processing stage, and 3) at any given one of the processing stages, connecting data packets from input ports of the given processing stage to the array of cores of that stage, so that a given data packet is connected to such a core, if any exist at a given time, among said array that is assigned at the given time to process a program instance to which the given input packet is directed to. Various embodiments of the method comprise further steps and features as follows: a) periodically allocating, by a controller at a given one of the processing stages, the array of cores of the given stage among instances of its locally hosted tasks at least in part based on volumes of data packets connected through the XC to its locally hosted tasks, with the controller, according to said allocating, inserting the identifications of the destination programs for the data packets passed from the given processing stage for switching at the XC, to provide isolation between different programs among the set; b) the steps of allocating and connecting, both at the XC and the given one of the processing stages, are implemented by hardware logic that operates without software involvement; c) supporting multiple instances of each of the locally hosted tasks at their processing stages, and packet switching through the XC to an identified instance of a given destination task; d) said tasks are located across at least a certain subset of the processing stages so as to provide an equalized expected aggregate task processing load for each of the processing stages of said subset; and/or e) said tasks are identified with incrementing intra-program task IDs according to their descending processing load levels within a given program, wherein, among at least a subset of the processing stages, each processing stage of said subset hosts one of the tasks of each of the set programs so as to equalize sums of said task IDs of the tasks located on each of the processing stages of said subset.

A further aspect of the invention provides hardware logic system for connecting input data to instances of a set of programs hosted on a manycore processor having an array of processing cores. Such a system comprises: 1) demultiplexing logic for connecting input data packets from a set of input data ports to destination program instance specific input port buffers based on a destination program instance identified for each given input data packet, and 2) multiplexing logic for connecting data packets from said program instance specific buffers to the array of cores based on identifications, for each given core of the array, of a program instance assigned for execution at the given core at any given time. An embodiment of the system further comprises a hardware logic controller that periodically assigns, at least in part based on volumes of input data packets at the program instance specific input port buffers, instances of the programs for execution on the array of cores, and accordingly forms, for the multiplexing logic, the identification of the program instance that is assigned for execution at each core of the array of cores.

Yet further aspect of the invention provides a method for connecting input data to instances of a set of programs hosted on a manycore processor having an array of processing cores. Such a method comprises: 1) demultiplexing input data packets from a set of input data ports to destination program instance specific input port buffers according to a destination program instance identified for each given input data packet, and 2) multiplexing data packets from said program instance specific buffers to the array of cores according to identifications, for each given core of the array, of a program instance assigned for execution at the given core at any given time. In a particular embodiment of the method comprise a further step as follows: periodically forming the identifications of the program instances executing at the array of cores through i) allocating the array of cores among the set of programs at least in part based on volumes of input data packets at the input port buffers associated with individual programs of the set and ii) assigning, based at least in part based on said allocating, the cores of the array for executing specific instances of the programs. Moreover, in an embodiment, the above method is implemented by hardware logic that operates without software involvement.

A yet further aspect of the invention provides a method for periodically arranging a set of executables of a given software program in an execution priority order, with an executable referring to a task, an instance, an instance of a task of the program, or equals thereof. Such a method comprises: 1) buffering input data at an array of executable specific input port buffers, wherein a buffer within said array buffers, from an input port associated with the buffer, such data that arrived that is directed to the executable associated with the buffer, 2) calculating numbers of non-empty buffers associated with each of the executables, and 3) ranking the executables in their descending execution priority order at least in part according to their descending order in terms numbers of non-empty buffers associated with each given executable. In a particular embodiment of this method, the step of ranking involves I) forming, for each given executable, a $1^{st}$ phase bit vector having as many bits as there are input ports from where the buffers receive their input data, with this number of ports denoted with X, and wherein a bit at index x of said vector indicates whether the given executable has exactly x non-empty buffers, with x being an integer between 0 and X, II) forming, from bits at equal index values of the $1^{st}$ phase bit vectors of each of the executables, a row of X $2^{nd}$ phase bit vectors, where a bit at index y of the $2^{nd}$ phase bit vector at index x of said row indicates whether an executable with ID number y within the set has exactly x non-empty buffers, wherein y is an integer from 0 to a maximum number of the executables less 1, as well as III) the following substeps: i) resetting the present priority order index to a value representing a greatest execution priority; and ii) until either all bits of each of the $2^{nd}$ phase bit vectors are scanned or an executable is associated with the lowest available execution priority, scanning the row of the $2^{nd}$ phase bit vectors for active-state bits, one $2^{nd}$ phase bit vector at a time, starting from row index X while decrementing the row index after reaching bit index 0 of any given $2^{nd}$ phase bit vector, and based upon encountering an active-state bit: i) associating the executable with ID equal to the index of the active-state bit within its $2^{nd}$ phase bit vector with the present priority order index and ii) changing the present priority order index to a next lower level of execution priority. Moreover, in an embodiment, the above method is implemented by hardware logic that operates without software involvement.

DETAILED DESCRIPTION

Figure 1:
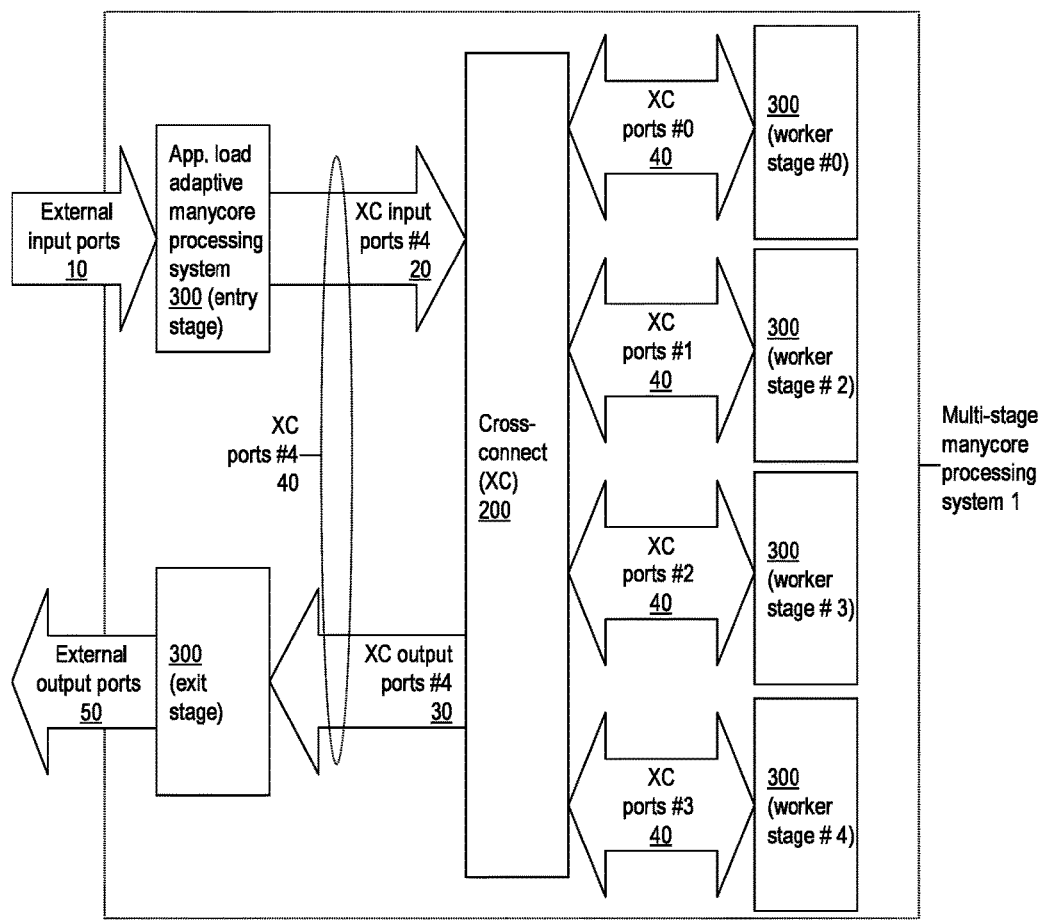
FIG. 1 shows, in accordance with an embodiment of the invention, a functional block diagram for multi-stage manycore processor system.

General notes about this specification (incl. text in the drawings):

For brevity: 'application (program)' is occasionally written in as 'app', 'instance' as 'inst' and 'application-task/instance' as 'app-task/inst'.

Receive (RX) direction is toward the cores of the manycore processor of a given processing stage, and transmit (TX) direction is outward from the cores.

The term IO refers both to the system 1 (FIG. 1) external input and output ports as well as ports interconnecting the processing stages 300 of the system.

Ports, such as external or inter-stage ports of the multi-stage parallel processing system 1 (FIG. 1) can be implemented either as distinct physical ports or as e.g. time or frequency division channels on shared physical connections.

Terms software program, application program, application and program are used interchangeably in this specification, and each generally refer to any type of computer software able to run on data processing systems based on the architecture.

Term 'task' in this specification refers to a part of a program, and covers the meanings of related terms such as actor, thread etc.

References to a "set of" units of a given type, such as programs, logic modules or memory segments can, depending on the nature of a particular embodiment or operating scenario, refer to any positive number of such units.

While the term 'processor' more specifically refers to the processing core fabric 510 (FIG. 5), it will also be used, where it streamlines the text, to refer to a processor system 500 (FIGS. 3-4) and a processing stage 300 (FIGS. 1 and 3) within the system 1.

Typically, there will be one task type per an application hosted per each of the processing stages 300 in the system 1 per FIG. 1 (while the system 1 supports multiple processing stages and multiple application programs per each stage).

A master type task of a single application-instance (app-inst) hosted at entry stage processing system can have multiple parallel worker type tasks of same type hosted at multiple worker stage processing systems. Generally, a single upstream app-inst-task can feed data units to be processed in parallel by multiple downstream app-inst-task:s within the same system 1.

Identifiers such as 'master' and 'worker' tasks or processing stages are not used here in a sense to restrict the nature of such tasks or processing; these identifiers are here used primarily to illustrate a possible, basic type of distribution of workloads among different actors. For instance, the entry stage processing system may host, for a given application, simply tasks that pre-process (e.g. qualify, filter, classify, format, etc.) the RX data units and pass them to the worker stage processing systems as tagged with the pre-processing notations, while the worker stage processor systems may host the actual master (as well as worker) actors conducting the main data processing called for by such received data units. Generally, a key idea of the presented processing system and IO architecture is that the worker stages of processing—where bulk of the intra-application parallel and/or pipelined processing typically is to occur, providing the performance gain of using parallel task instances and/or pipelined tasks to lower the processing latency and improve the on-time IO throughput—receive their input data units as directed to specific destination app-task instances, while the external parties are allowed to communicate with a given application program hosted on a system 1 through a single, constant contact point (the 'master' task hosted on the entry stage processor, possibly with its specified instance).

Specifications below assume there to be X IO ports, Y core slots on a processor 500, M application programs configured and up to N instances per each application for a processor 500, and up to T tasks (or processing stages) per a given application (instance), wherein the capacity parameters X, Y, M, N and T are some positive integers, and wherein the individual ports, cores, applications, tasks and instances, are identified with their ID#s ranging from 0 to said capacity parameter value less 1 for each of the measures (ports, cores, apps, instances, tasks or processing stages).

The invention is described herein in further detail by illustrating the novel concepts in reference to the drawings. General symbols and notations used in the drawings:

Boxes indicate a functional digital logic module; unless otherwise specified for a particular embodiment, such modules may comprise both software and hardware logic functionality.

Arrows indicate a digital signal flow. A signal flow may comprise one or more parallel bit wires. The direction of an arrow indicates the direction of primary flow of information associated with it with regards to discussion of the system functionality herein, but does not preclude information flow also in the opposite direction.

A dotted line marks a border of a group of drawn elements that form a logical entity with internal hierarchy, such as the modules constituting the multi-core processing fabric 110 in FIG. 1.

Lines or arrows crossing in the drawings are decoupled unless otherwise marked.

For clarity of the drawings, generally present signals for typical digital logic operation, such as clock signals, or enable, address and data bit components of write or read access buses, are not shown in the drawings.

FIGS. 1-10 and related descriptions below provide specifications for embodiments and aspects of an extensible, multi-stage, application program load and type adaptive, multi-stage parallel data processing system, including for the input and output (10) subsystems thereof.

FIG. 1 illustrates, according to an embodiment of the invention, a multi-stage manycore processor system architecture, comprising a set of application processing load adaptive manycore processing stages interconnected by a packet destination app-task-inst controlled cross connect. The discussion in the following details an illustrative example embodiment of this aspect of the invention. Note that the number of processing stages 300 and XC ports 40 shown is just for a purpose of one possible example; various implementations may have any practical number of such stages and ports.

Figure 4:
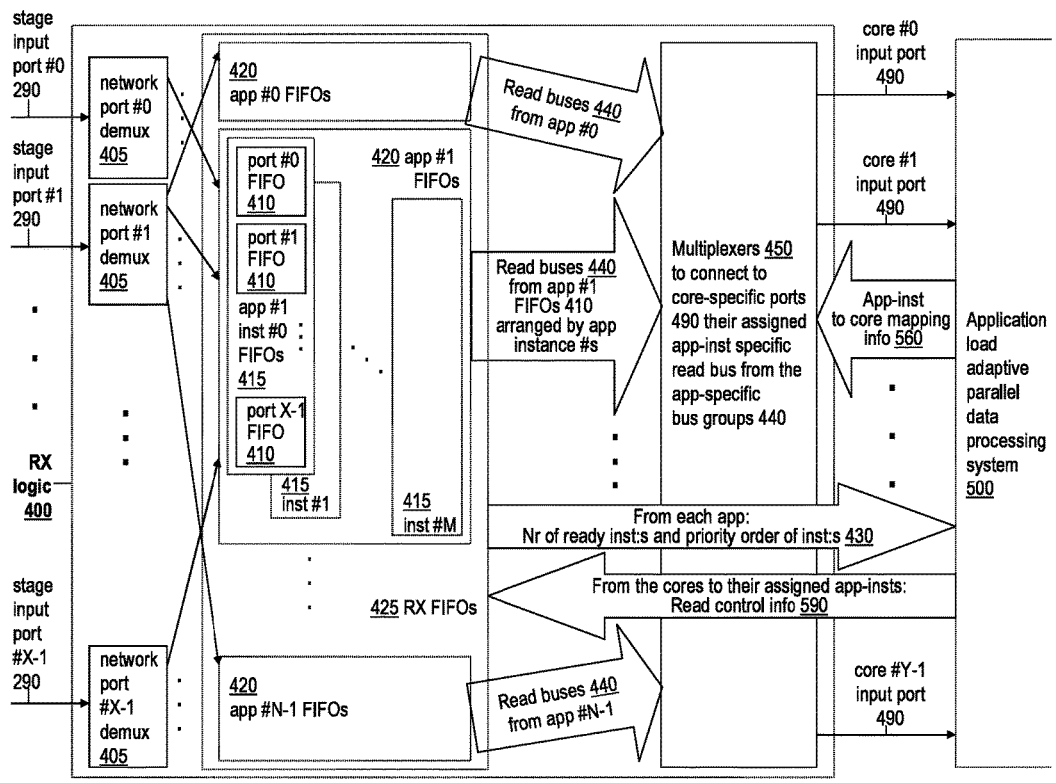
FIG. 4 shows, in accordance with an embodiment of the invention, a functional block diagram for the input data receive logic subsystem for the manycore processor system per FIG. 3.
Figure 5:
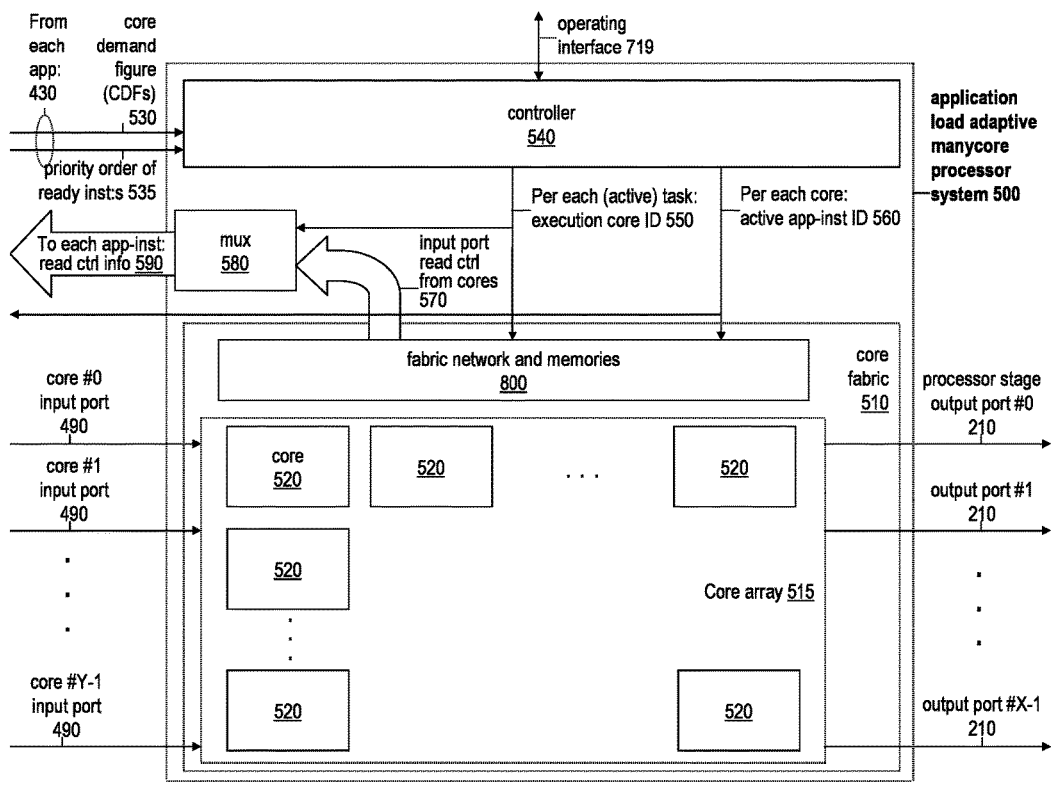
FIG. 5 shows, in accordance with an embodiment of the invention, a functional block diagram for the application load adaptive parallel data processing subsystem for a given manycore processing system of FIG. 3 within the multi-stage processor system in FIG. 1.

General operation of the application load adaptive, multi-stage parallel data processing system 1 per FIG. 1, focusing on the main 10 data flows, is as follows: The system 1 provides data processing services to be used by external parties (e.g. client portions of programs whose server portions run on the system 1) over networks. The system 1 receives data units (e.g. messages, requests, data packets or streams to be processed) from its users through its RX network ports 10, and transmits the processing results to the relevant parties through its TX network ports 50. Naturally the network ports of the system of FIG. 1 can be used also for connecting with other (intermediate) resources and services (e.g. storage, data bases etc.) as and if necessary for the system to produce the requested processing results to the relevant external parties. The application program tasks executing on the entry stage manycore processor 300 are typically of 'master' type for parallelized applications, i.e., they manage and distribute the processing workloads for 'worker' type tasks running on the worker stage manycore processing systems 300 (note that the processor system 300 hardware implementations are similar for all instances of the processing system 300). The instances of master tasks typically do preliminary processing (e.g. message/request classification, data organization) and workflow management based on given input packet(s), and then typically involve appropriate worker tasks at their worker stage processors (see FIG. 1 for context) to perform the data processing called for by the given input packet(s), potentially in the context of and in connection with other related input packets and/or other data elements (e.g. in memory or storage resources accessible by the system 1) referred to by such input packets. (Note that processors 300 can also have access to the system memories through interfaces additional to the IO ports shown in the FIGS.) Accordingly, the master tasks typically pass on the received data units (using direct connection techniques to allow most of the data volumes being transferred to bypass the actual processor cores) through the XC 200 to the worker stage processors, with the destination app-task instance identified for each data unit. As a security feature, to provide isolation among the different applications 620 (FIG. 6) configured to run on the processors 300 of the system 1, by default the hardware controller 540 (FIGS. 5 and 7) of each processor 300, rather than any application software (executing at a given processor 300), inserts the application ID# bits for the data packets passed to the XC 200. That way, the tasks of any given application running on the processing stages 300 in a system 1 can trust that the packets they received from the XC 200 are from its own application. Note that the controller 540 determines, and therefore knows, the application ID# that each given core within its processor 500 is assigned to at any given time, via the app-inst to core mapping info 560 that the controller produces (FIGS. 4, 5 and 7). Therefore the controller 540 is able to insert the presently-assigned app ID# bits for the inter-task data units being sent from the cores of its processing stage 300 over the core-specific output ports 20, 210 (FIG. 3) to the XC 200.

While the processing of any given application (server program) at a system 1 is normally parallelized and/or pipelined, and involves multiple tasks (many of which tasks and instances thereof can execute simultaneously on the manycore arrays of the processors 300), the system enables external parties to communicate with any such application hosted on the system 1 without having to know about any specifics (incl. existence, status, location) of their internal tasks or parallel instances thereof. As such, the incoming data units to the system 1 are expected to identify just their destination application (and where it matters, the application instance number), rather than any particular task within it. Moreover, the system enables external parties to communicate with any given application hosted on a system 1 through any of the network ports 10, 50 without knowing whether or at which cores any instance of the given application task (app-task) may be executing at any time. Furthermore, the architecture enables the aforesaid flexibility and efficiency through its hardware logic functionality, so that no system or application software running on the system 1 needs to either be aware of whether or where any of the instances of any of the app-tasks may be executing at any given time, or through which port any given inter-task or external communication may have occurred or be occurring. Thus the system 1, while providing a highly dynamic, application workload adaptive usage of the system processing and communications resources, allows the software running on and/or remotely using the system to be designed with a straightforward, abstracted view of the system: the software (both the server programs hosted on a system 1 as well as clients etc. remote agents interacting with such programs hosted on the system) can assume that all applications (as well all their tasks and instances thereof) hosted on by the given system 1 are always executing on their virtual dedicated processor cores within the system. Also, where useful, said virtual dedicated processors can also be considered by software to be time-share slices on a single (very high speed) processor. The architecture thereby enables achieving, at the same time, both the vital application software development productivity (simple, virtual static view of the actually highly dynamic processing hardware) together with high program runtime performance (scalable parallel program execution with minimized overhead) and resource efficiency (adaptively optimized resource allocation) benefits. Techniques enabling such benefits of the architecture are described in the following through more detailed technical study of the system 1 and its subsystems.

In FIG. 1, the processing stage 300 specific XC IO ports 40 contain one input and output port per a processing core at any given stage, with such individual IO ports of any given stage identified as ports #0, 1, . . . , Y−1 (noting that the input ports of any given processing stage are not tied to or associated with any particular core, but instead, input data units can be connected from all input ports to all cores of any given processing stage as needed). The XC 200 provides data unit (referred to as packet) level switched, restriction-free, any-to-any connectivity among the mentioned processing stage IO ports of the same port index #y (y=0, 1, . . . Y−1): E.g. the XC provides packet-switched connectivity to input ports #5 of each stage 300 from the output ports #5 of each stage 300 of the system 1 (assuming Y is greater than 5). This cross-connectivity is implemented through data source specific buffering and load-weigh prioritized fair muxing of packets to the XC output ports (i.e. to processing stage 300 input ports 30). An embodiment of a micro-architecture for such XC output port logic is as illustrated in FIG. 2.

Figure 2:
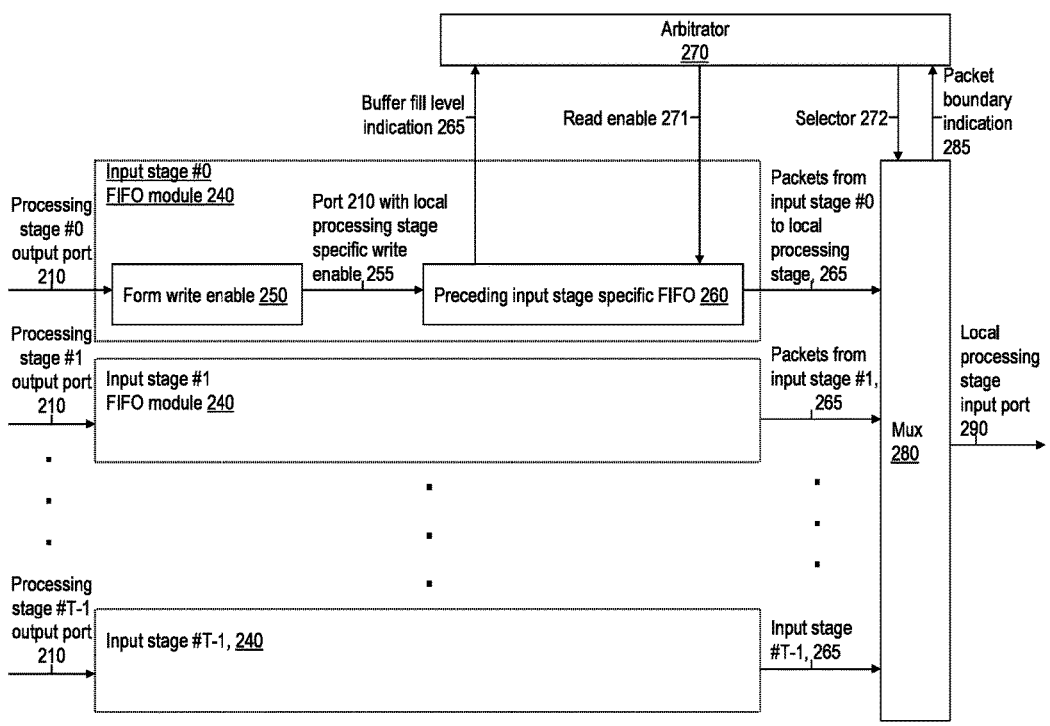
FIG. 2 shows, in accordance with an embodiment of the invention, a functional block diagram for a cross-connect at the multi-stage manycore processor system of FIG. 1.

FIG. 2 presents, according to an embodiment of the invention, a functional block diagram for forming at the XC 200 a given input port 290 (see FIG. 3) to a given processor 300 of FIG. 1. The discussion in the following details an illustrative example embodiment of this aspect of the invention.

The XC 200 subsystems per FIG. 2 provide data connectivity to a given input port #y (y=0, 1, . . . Y−1) from output ports #y of each of the processing systems 300 of the system 1, and there is a subsystem per FIG. 2 for each input port 290 to each processing system 300. Note that the XC 200 is formed by providing the processing stage input port 290 specific subsystem per FIG. 2 for each input port of each of the processing stages 300 interconnected by the XC 200. At each a subsystem per FIG. 2, there are first-in first-out buffers (FIFOs) 260 per each preceding processing stage of the input packets, in which FIFOs packets whose identified next processing app-task ID matches the processing stage to which the XC output in question connects to (referred to as the local processing stage in FIG. 2) are queued, plus an arbitration logic module 270 for selecting, at times when a new packet is to be sent over the local XC output port 290, an appropriate input-stage specific FIFO 260 from which to send the next packet to the local processing stage. The next input-stage specific FIFO is chosen by the arbitrator 270 by running a round-robin selection algorithm first among those input-stage specific FIFOs whose fill level is indicated 265 as being above a defined threshold, and in the absence of such FIFOs, running a plain round robin algorithm across all the FIFOs for the given XC output port. For the FIFO module 260 selected by the arbitrator at any given time, the arbitrator activates the read enable signal 271. The arbitrator also controls the mux (mux) 280 to connect to its output 290 the packet output 265 from the FIFO module 240 selected at the time.

Note that in FIG. 2, there are submodules 250 and 260 associated with the input data streams from each of the preceding processing stages #0, 1, . . . T−1 similar to those drawn in more detail for the stage #0. Though not included in FIG. 2, similar signals (fill level indication 265 and read enable 271) exist between each of the preceding processing stage specific FIFO modules 240 and the arbitrator 270, as is shown between the module specific to preceding stage #0 and the arbitrator.

Moreover, the set of applications 610 (FIG. 6) configured to run on the system 1 have their tasks identified by (intra-application) IDs according to their descending order of relative (time-averaged) workload levels. The sum of the intra-application task IDs (each representing the workload ranking of its tasks within its application) of the app-tasks hosted at any given processing system 300 is equalized by appropriately configuring the tasks of differing ID#s (i.e. of differing workload levels) across the applications for each processing system 300, to achieve optimal overall load balancing. For instance, in case of four processing stages 300 (as shown in the example of FIG. 1), if the system is shared among four applications and each of that set of applications has four tasks, for each application of that set, the busiest task (i.e. the worker task most often called for or otherwise causing the heaviest processing load among the tasks of the app) is given ID #0, the second busiest task ID #1, the third busiest ID #2, and the fourth ID #3. To balance the processing loads across the applications among the worker stage processors 300 of the system 1, the worker stage processor #t gets task ID#t+m (rolling over at 3 to 0) of the application ID #m (t=0, 1, . . . T−1; m=0, 1, . . . M−1). In this example scenario of four application streams, four worker tasks per app as well as four processors 300 in a system 1, the above scheme causes the task IDs of the set of apps to be placed at the processing stages per the table below (t and m have the meaning per the previous sentence):

| App ID# m (to right) => Stage# t (below) | 0 | 1 | 2 | 3 |
|---|---|---|---|---|
| 0 | 0 | 1 | 2 | 3 |
| 1 | 1 | 2 | 3 | 0 |
| 2 | 2 | 3 | 0 | 1 |
| 3 | 3 | 0 | 1 | 2 |

As seen in the example of the table above, the sum of the task ID#s (with each task ID# representing the workload ranking of its task within its application) is the same for any row i.e. for each of the four processing stages of this example. Applying this load balancing scheme for differing numbers of processing stages, tasks and applications is straightforward based on the above example and the discussion herein. In such system wide processing load balancing schemes supported by system 1, a key idea is that each worker stage processor 300 gets one of the tasks from each of the applications so that collectively the tasks configured for any given worker stage processor 500 have the intra-app task IDs of the full range from ID #0 through ID#T−1 with one task of each ID# value (wherein the intra-app task ID#s are assigned for each app according to their descending busyness level) so that the overall task processing load is to be, as much as possible, equal across all worker-stage processors 300 of the system 1. Advantages of these schemes supported by systems 1 include achieving optimal utilization efficiency of the processing resources and eliminating or at least minimizing the possibility or effects of any of the worker-stage processors 300 forming system wide performance bottlenecks. In FIG. 2, each of the logic modules 250 for forming write enable signal performs the algorithm per above, thus selecting which packets (based on their destination app-task ID#) to pass to its local FIFO 260 from its associated preceding processing stage.

Figure 3:
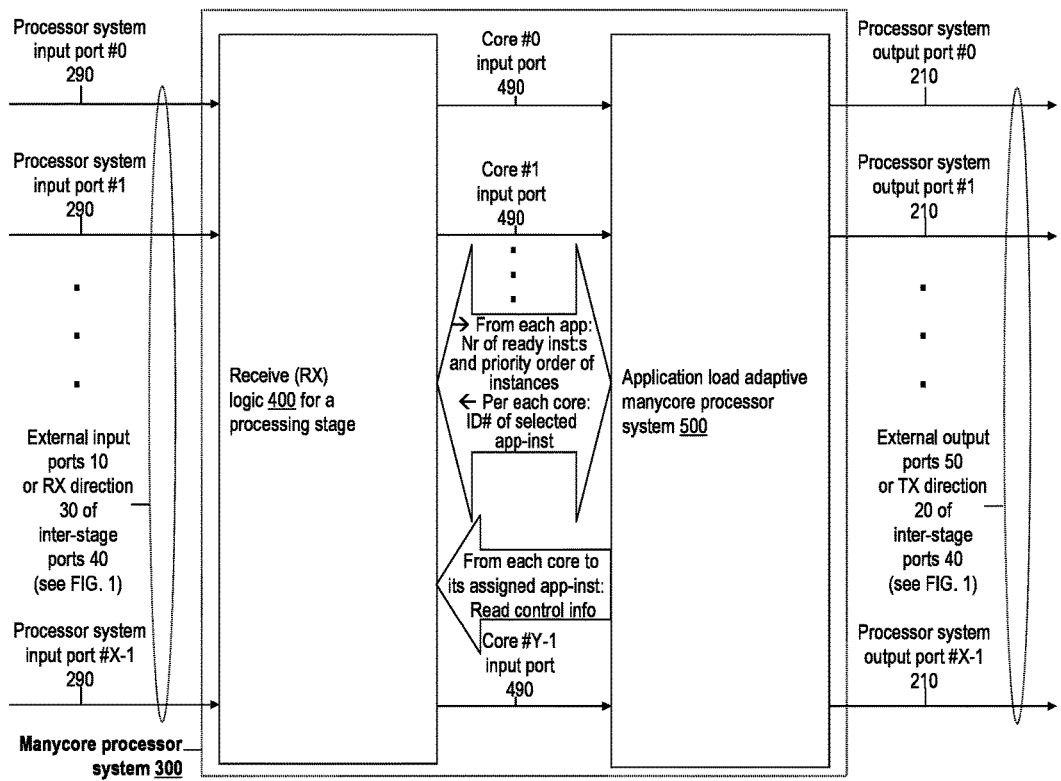
FIG. 3 shows, in accordance with an embodiment of the invention, a high-level functional block diagram for any of the manycore processor systems in the multi-stage processor system in FIG. 1.

In the following, we continue by exploring the internal structure and operation of a given processing stage 300, a high level functional block diagram for which is shown in FIG. 3.

FIG. 3, presents, according to an embodiment of the invention, a top level functional block diagram for any of the manycore processing systems 300 in the multi-stage parallel processing system in FIG. 1, involving a RX logic subsystem and manycore processor subsystem. The discussion in the following details an illustrative example embodiment of this aspect of the invention.

As illustrated in FIG. 3, any of the processing systems 300 of system 1 (FIG. 1) has, besides manycore processor system 500 (detailed in FIGS. 5-10), an RX logic subsystem 400, which connects input data units (packets) from any of the input ports 290 to any of the processing cores of the manycore processor 500, according at which core their indicated destination app-task-instance may be executing at any given time. Moreover, the monitoring of the buffered input data load levels per their destination app-task instances at the RX logic subsystem 400 allows optimizing the allocation of processing core capacity of the local manycore processor 500 among the application tasks hosted on the given processing system 300. The structure and operation of an embodiment of the RX logic subsystem 400 for the manycore processing system per FIG. 3 is detailed below in connection with FIG. 4.

FIG. 4 illustrates, according to an embodiment of the invention, main data flows of the RX logic subsystem 400, which connects input packets from any of the input ports 290 to any of the processing cores of the processor system 500, according to at which core the destination app-task instance indicated for any given input may be executing at any given time. The discussion below details an illustrative example embodiment of this aspect of the invention.

The RX logic connecting the input packets from the input ports 290 to the local processing cores arranges the data from all the input ports 290 according to their indicated destination applications and then provides for each core of the manycore processor 500 read access to the input packets for the app-task instance executing on the given core at any given time. At this point, it shall be recalled that there is one app-task hosted per processing stage 500 per each of the applications 610 (FIG. 6), while there can be up to Y instances in parallel for any given app-task. Since there is one app-task per app per processing stage, the term app-inst in the following, including in and in connection to FIGS. 4-11, means an instance of an application task hosted at the processing stage under study.

The main operation of the RX logic shown in FIG. 4 is as follows: First input packets arriving over the network input ports 290 are grouped to a set of destination application specific FIFO modules 420, whose fill levels (in part) drives the allocation and assignment of cores at the local manycore processor 500 among instances of the app-tasks hosted on that processor, in order to maximize the total (value-add, e.g. revenue, of the) data processing throughput across all the application programs configured for the manycore processor system. From the app-inst specific buffers 415 within the destination application buffer modules 420, the input packets are then connected 450 to specific cores of the processor 500 where their associated app-inst:s are executing at a given time (when the given app-inst is selected for execution). At greater level of detail, the data flow of the RX logic 400, and its interactions with its local manycore processor 500, are detailed in the following:

The input packets arriving over the input ports are demuxed by individual RX network port specific demultiplexers (demux:s) 405 to their indicated (via overhead bits) destination app-inst and input port specific FIFO buffers 410. At the RX subsystem 400, there will thus be FIFOs 410 specific to each input port 290 for each app-inst able to run on the manycore processor 500. In FIG. 4, the app-inst specific collections 415 and application-scope collections 420 of these FIFOs 410 is shown for the application ID #1 to keep the diagram reasonably simple; however similar arrangements exist for each of the applications IDs #0 through #N. Similarly, though FIG. 4 for clarity shows the connections from the input port #1 to the application FIFOs 425, and connections from the input ports just to application #1 FIFOs, these connections shall be understood to exist between each input port 290 and RX FIFO collection 420 of each application. A reason for these collections of input port specific buffers 410 for each app-inst is to allow writing all input packets directly, without delaying or blocking other data flows, to a buffer, even when a given destination app-inst was receiving data from multiple, and up to all, of the input ports at the same time. Moreover, the app-inst level connection of packets between the processing stages 300 (enabled in part by the app-task-inst specific buffering 415) also allows the system 1 to efficiently maintain continued data flows across the system specific to particular instances of application tasks originating or consuming a given sequence of data packets.

Logic at each application scope FIFO module 420 signals 430 to the manycore processor system 500 the present processing load level of the application as a number of the ready to execute instances of the given app-task and, as well as the priority order of such instances. An app-inst is taken as ready to execute when it has unread input data in its FIFO 410. As discussed in greater depth in connection with FIGS. 5-7, based on the info 430 from the applications, the processor system 500 periodically, e.g. at intervals of 1024 processor clock cycles, assigns to each of its cores one of the locally hosted app-inst:s, in a manner as to maximize the system wide (value add of the) data processing throughput. According to such periodic assignments, the processor system 500 provides control for the mux:s 450 to connect to each of its cores the read data bus 440 from the appropriate app-inst FIFO 415. Logic at app-inst FIFO module 415 selects (at packet boundaries) one of its the port specific FIFOs 410 for reading out data to its associated mux at module 450 at times when the given app-inst is selected to execute. Similar FIFO read selection algorithm is used in this case as what was described in connection to FIG. 2 for selecting a FIFO for reading onto a port 290. In addition, the controller 540 also dynamically controls mux:s 580 (FIG. 5) to appropriately connect input data read control information 590 to the app-instance FIFOs 415, to direct reading of input data by the app-inst selected to execute on any of its cores at the given time.

For the info flow 430 (FIGS. 4 and 5), which is used for optimally allocating and assigning the cores of the processor 500 among the locally hosted app inst:s, the number of ready to execute instances for a given app-task is taken as its number of FIFO modules 415 that at the given time have one or more of their input port specific FIFOs 410 non-empty. Moreover, the logic at each app-scope FIFO module 420 ranks its instances in an execution priority order (for the info flow 430) based on how many non-empty FIFOs 410 each of its instance-scope modules 415 has. This logic forms, from the modules 415, X instances (equal to number of input ports) of N-bit vectors wherein the bit[n] of such vector instance #x (=0, 1, . . . X) represents whether app-instance #n at the time has (no more and no less than) x non-empty FIFOs 410. At times of writing 430 the updated app-inst priority lists to the local manycore processor system 500, this logic at module 420 scans these vectors for active bits, starting from priority 0 (highest priority), and proceeding toward greater instance priority index (signifying descending instance priority), and from the maximum value of x (that is, X and proceeding down toward 0). When this logic encounters an active bit, the logic writes the ID# number of its associated app-inst (i.e., the index of that bit, n) to the current priority index at the (descending) priority-indexed app-inst ID# look-up-table (see a format for the LUT at Table 3 shown later in this specification, under heading "Summary of process flow and information formats . . . "), at the controller module (540, FIGS. 5 and 7) of the manycore processor system 500, for the controller 540 to use when selecting the instances of the given application to execute on the cores allocated to that application on the following core allocation period. Furthermore, the above discussed logic at the any given app-scope FIFO module 420 starts its successive runs of the app-inst priority list production from a revolving bit index n (incrementing by one after each run of the algorithm, from 0 through N−1 and rolling over to 0 and so forth), to over time provide equality among the instances of the given application (having same number of non-empty port FIFOs 410).

The RX logic subsystem 400 is implemented by digital hardware logic and is able to operate without software involvement. Note that the concept of software involvement as used in this specification relates to active, dynamic software operation, not to configuration of the hardware elements according aspects and embodiments of the invention through software where no change in such configuration is needed to accomplish the functionality according to this specification.

This specification continues by describing the internal elements and operation of the processor system 500 (for the processing system 300 of FIG. 3, within the multi-stage parallel processing system 1 of FIG. 1), a block diagram for an embodiment of which is shown in FIG. 5.

FIG. 5 presents, according to an embodiment of the invention, a functional block diagram for the manycore processor system 500 dynamically shared among instances of the locally hosted application program tasks, with capabilities for application processing load adaptive allocation of the cores among the applications, as well as for (as described in relation to FIGS. 8-10) accordant dynamically reconfigurable memory access by the app-task instances. The discussion below details an illustrative example embodiment of this aspect of the invention.

Any of the cores 520 of a system 500 can comprise any types of software program processing hardware resources, e.g. central processing units (CPUs), graphics processing units (GPUs), digital signal processors (DSPs) or application specific processors (ASPs) etc., and in programmable logic (FPGA) implementation, the core type for any core slot 520 is furthermore reconfigurable per expressed demands 430 of the active app-tasks.

As illustrated in FIG. 5, the processor system 500 comprises an array 515 of processing cores 520, which are dynamically shared among a the locally hosted tasks of a set of application programs configured to run on the system 1. The logic at application specific modules 420 (FIG. 4) write via info flows 430 their associated applications' capacity demand indicators 530 to the controller 540. Each of these indicators 530, referred to herein as core-demand-figures (CDFs), express how many cores 520 their associated app-task is presently able utilize for its ready to execute instances. Moreover, the RX logic for the individual applications write the application CDFs to a look-up-table (LUT) at the controller per Table 1 format, as described later on in this specification under heading "Summary of process flow and information formats . . . ". Furthermore, these capacity demand expressions 430, written to controller 540 by the RX logic (at module 420) of each locally hosted app-task, include a list 535 identifying its ready instances in a priority order per LUT of Table 3 format, also described later on in this specification under the heading "Summary of process flow and information formats . . . ".

A hardware logic based controller module 540 within the processor system 500, through a periodic process, allocates and assigns the cores 520 of the processor 500 among the set of applications 610 (FIG. 6) and their instances, at least in part based on the CDFs 530 of the applications. This application instance to core assignment process 700 (see FIGS. 6 and 7) is exercised periodically, e.g. at intervals such as once per a defined number (for instance 64, 256 or 1024, or so forth) of processing core clock or instruction cycles. The application instance to core assignment algorithms of the controller 540 produce, for the application instances on the processor 500, identification 550 of their execution cores (if any, at any given time), as well as for the cores of the fabric 515, identification 560 of their respective app-inst:s to process. As shown in FIGS. 4 and 5, the app-inst to core mapping info 560 also directs the muxing 450 of input data from an appropriate app-inst to each core of the array 515. The app-inst to core mapping info 550 is also used to configure the muxing 580 of the input data read control signals from the core array 515 (via info flow 590) to the FIFOs 415 of the app-inst assigned for any given core.

Note that the verb "to assign" is used herein reciprocally, i.e., it can refer, depending on the perspective, both to assignment of cores 520 to app-inst:s 640 (see FIG. 6) as well as to mapping of app-inst:s 640 to cores 520. This is due to that the allocation and mapping algorithms of the controller 540 cause one app-inst 640 to be assigned per any given core 520 of the array 515 by each run of such algorithms 700 (see FIGS. 6 and 7). As such, when it is written here, e.g., that a particular core #x is assigned to process a given app-inst #y, it could have also been said that app-inst #y is assigned for processing by core #x. Similarly, references such as "core #x assigned to process app-inst #y", could be written in the (more complex) form of "core #x for processing app-inst #y assigned to it", and so forth.

Figure 6:
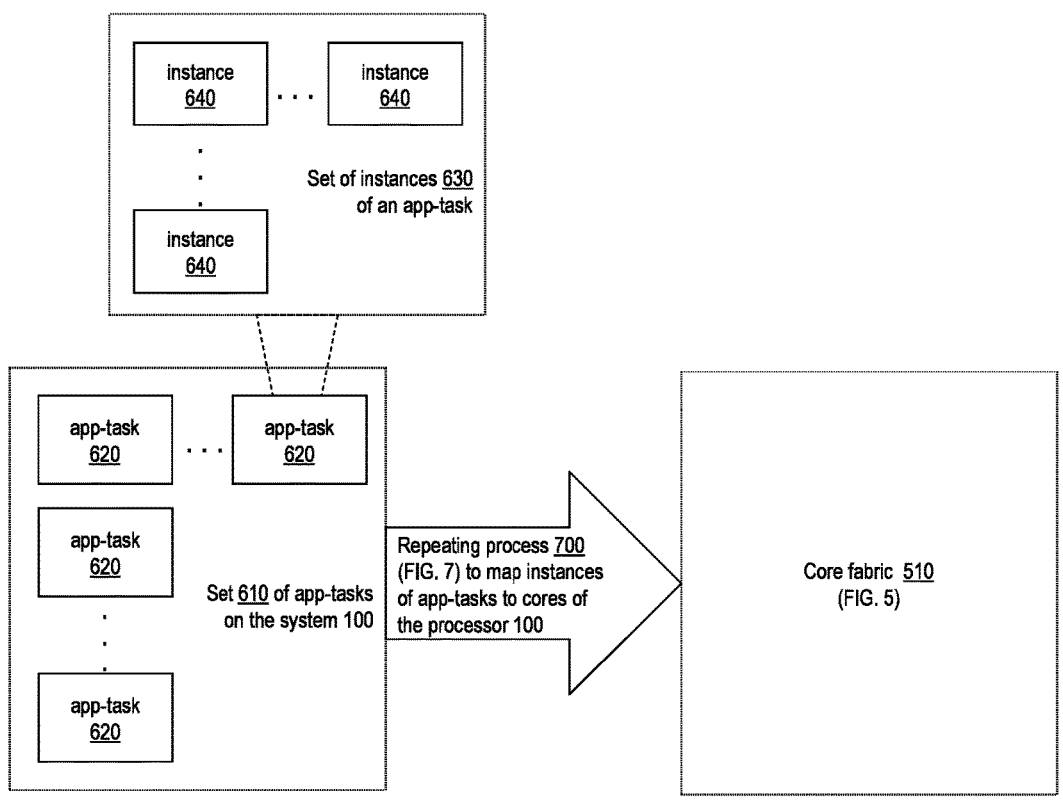
FIG. 6 illustrates, in accordance with an embodiment of the invention, a context diagram for the process of mapping (incl. selecting and placing) instances of the locally hosted application tasks to execute on the processing cores of the application load adaptive parallel data processing system per FIG. 5.
Figure 7:
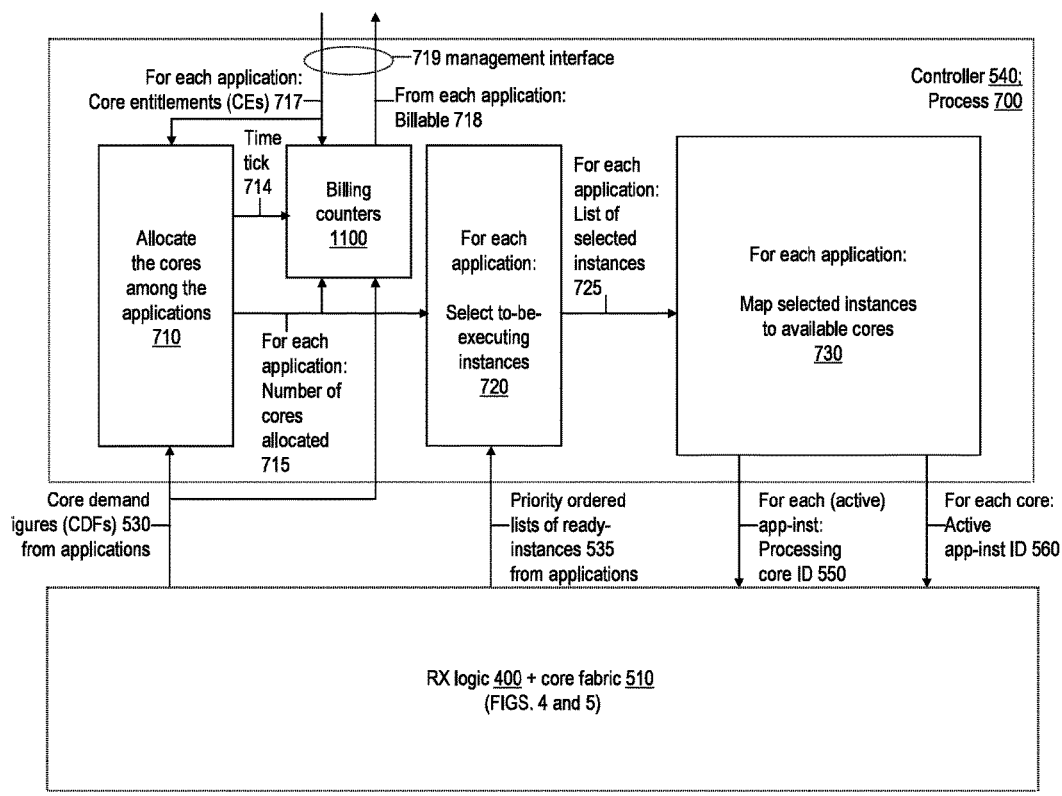
FIG. 7 illustrates, in accordance with an aspect of the invention, a flow diagram and major steps for the process per FIG. 6.

The controller module 540 is implemented by digital hardware logic within the system, and the controller exercises its repeating algorithms, including those of process 700 per FIGS. 6-7, without software involvement.

FIG. 6 illustrates, according to an embodiment of the invention, context for the process 700 performed by the controller logic 540 of the system 500, repeatedly selecting and placing the to-be-executing instances 640 of the set of locally hosted app-tasks 610 to their assigned target cores 520 within the array 515. The discussion below details an illustrative example embodiment of this aspect of the invention.

Per FIG. 6, each individual app-task 620 configured for a system 500 has its collection 630 of its instances 640, even though for clarity of illustration in FIG. 6 this set of instances is shown only for one of the applications within the set 610 configured for a given instance of system 500. Recalling that this multi-stage parallel processing architecture is designed for one task per application program per processing stage, in the following discussion (incl. text in FIGS. 7-10) of internal aspects of any of the processor systems 500 at a multi-stage processor system 1, references to 'application' (app) have the meaning of a locally hosted application task (app-task).

Note also that, among the applications 620 there can be supervisory or maintenance software programs for the system 500, used for instance to support configuring other applications 620 for the system 500, as well as provide general functions such as system boot-up and diagnostics.

In the context of FIGS. 4-6, FIG. 7 provides a data flow diagram for an embodiment of the process 700, which periodically selects app-inst:s for execution, and places each selected-to-execute app-inst 640 within the sets 630 to one of the cores 520 within the array 515.

FIG. 7 presents, according to an embodiment of the invention, major phases of the app-inst to core mapping process 700, used for maximizing the (value-add of the) application program processing throughput of the manycore fabric 510 shared among a number of software programs. The discussion below details an illustrative example embodiment of this aspect of the invention.

The process 700, periodically selecting and mapping the to-be-executing instances of the set 610 of applications to the array of processing cores within the processor 500, involves the following steps:

(1) allocating 710 the array 515 of cores among the set of applications 610, based on CDFs 530 and CEs 717 of the applications, to produce for each application 620 a number of cores 520 allocated to it 715 (for the time period in between the current and the next run of the process 700); and (2) based at least in part on the allocating 710, for each given application that was allocated at least one core: (a) selecting 720, according to the app-inst priority list 535, the highest priority instances of the given application for execution corresponding to the number of cores allocated to the given application, and (b) mapping 730 each selected app-inst to one of the available cores of the array 515, to produce, i) per each core of the array, an identification 560 of the app-inst that the given core was assigned to, as well as ii) for each app-inst selected for execution on the fabric 515, an identification 550 of its assigned core.

The periodically produced and updated outputs 550, 560 of the controller 540 process 700 will be used for periodically re-configuring connectivity through the mux:s 450 (FIG. 4) and 580 (FIG. 5) as well as the fabric memory access subsystem 800, as described in the following with references to FIGS. 8-10.

Figure 8:
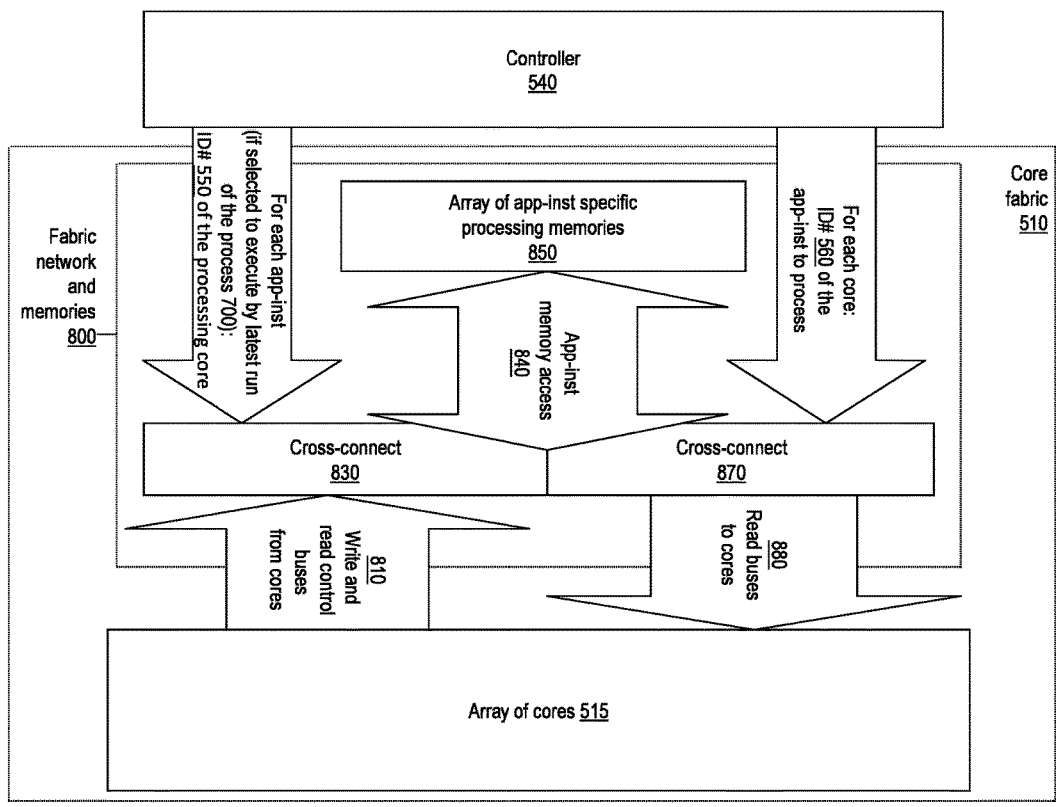
FIG. 8 illustrates, in accordance with an embodiment of the invention, a memory access architecture for the multicore fabric of the data processing system per FIG. 5.
Figure 9:
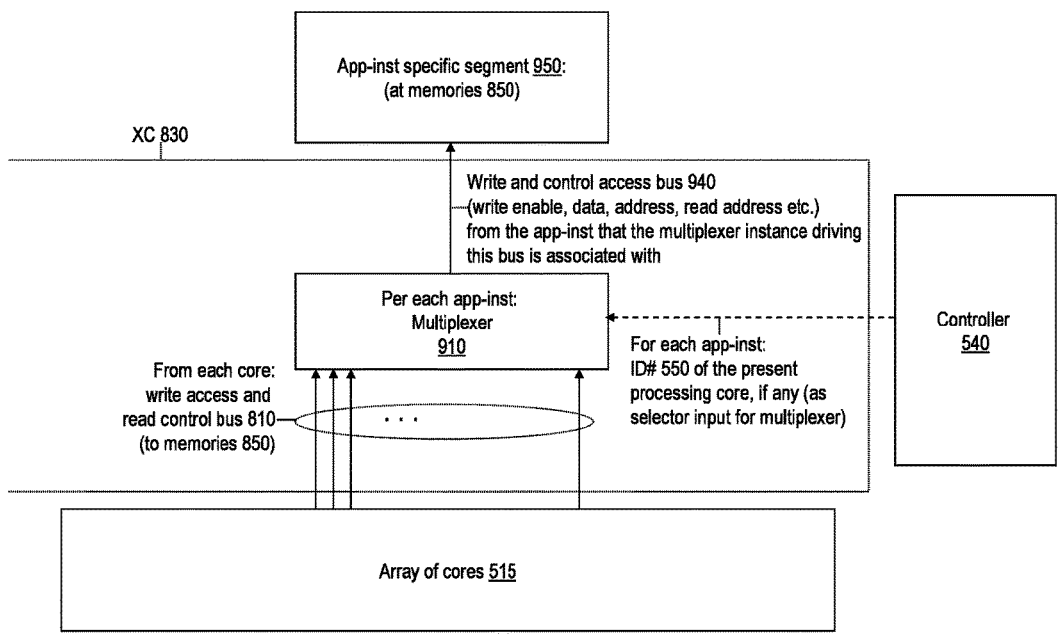
FIG. 9 shows, in accordance with an embodiment of the invention, at more detail level a portion of an embodiment of a logic system per FIG. 8 concerning write access from the cores of the fabric to the application instance (app-inst) specific fabric memory segments.
Figure 10:
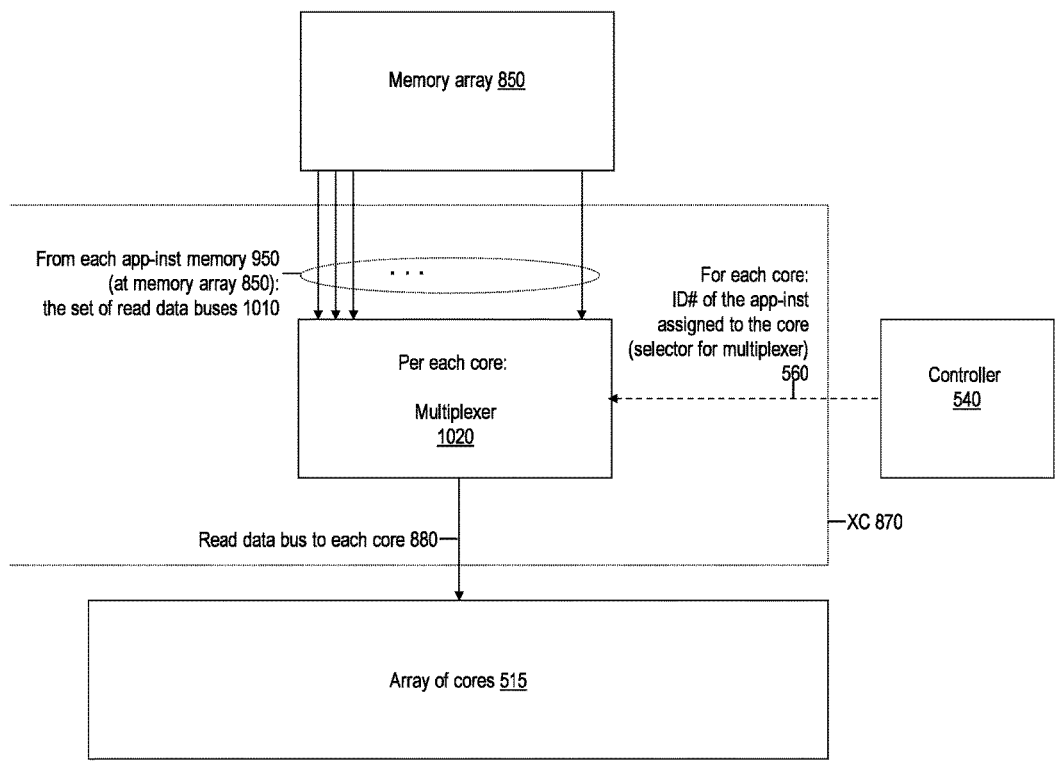
FIG. 10 shows, in accordance with an embodiment of the invention, at more detail level an embodiment of a portion of a logic system per FIG. 8 concerning read access by processing cores within the fabric to the app-inst specific fabric memory segments.

FIGS. 8-10. and related specifications below describe embodiments of the on-chip memory access subsystem 800 of a manycore processor 500 providing non-blocking processing memory access connectivity (incl. for program instructions and interim processing results) between the app-inst:s assigned to cores of the array 515 and app-inst specific memories at the memory array 850. The manycore fabric memory access subsystem per FIGS. 8-10 comprises hardware logic, and is able to operate without software involvement. The capabilities per FIGS. 8-10 provide logic, wiring, memory etc. system resource efficient support for executing any app-inst 640 at any core 520 within the processor 500 at any given time (as controlled by the controller 540 that periodically optimizes the allocation and assignment of cores of the array 515 among the locally hosted app-inst:s 620), while keeping each given app-inst connected to its own (program instruction and interim processing results containing) memory element at memory array 850.

Fabric Memory Access Subsystem for Manycore Processor Per FIG. 5:

FIG. 8 presents, according to an embodiment of the invention, logic arrangements to provide access by app-inst:s executing at the core array to app-inst specific memory locations within the core fabric. The discussion below details an illustrative example embodiment of this aspect of the invention.

Per FIG. 8, to direct write and read control access from the array of cores 515 to the array of app-inst specific memories 850, the controller 540 identifies 550, for a cross-connect (XC) 830 between the core array 515 and memory array 850, the presently active source core for write and read control access 810, 840 to each given app-inst specific segment 950 within the memory array 850. Similarly, to direct read access by the array of cores 515 to the array of app-inst specific memories 850, the controller also identifies 560 for the XC 870 the memory segment 950 (at the memory array 850) of the app-inst presently assigned for each given core 520 of the array.

Based on the control 560 by the controller 540 for a given core indicating that it will be subject to an app-inst switchover, the currently executing app-inst is made to stop executing and its processing state from the core is backed up 810, 940 (FIGS. 8 and 9) to the segment 950 of that exiting app-inst at the memory array 850 (FIGS. 8 and 9), while the processing state of the next instance assigned to execute on the given core is retrieved 1010, 880 to the core from the memory array 850 (FIGS. 8 and 10). Note that 'processing state' herein refers to processing status data, if any, stored at the core 520, such as the current executing app-inst specific processor register file contents etc. interim processing results. During these app-inst switching proceedings the operation of the cores subject to instance switchover is controlled through the controller 540 and switchover logic at the cores 520, with said switchover logic backing up and retrieving the outgoing and incoming app-inst processing states from the memories 850. Cores not indicated by controller 540 as being subject to instance switchover continue their processing uninterruptedly through the Core Allocation Period (CAP) transition times.

Note that applying of updated app-inst ID# configurations 560 for the core specific mux:s 1020 of XC 870 (see FIGS. 8 and 10), as well as applying of the updated processing core ID# configurations 550 for the app-inst specific mux:s 910 at XC 830 (see FIGS. 8 and 9), can be safely and efficiently done on one mux at a time basis (reducing the system hardware and software implementation complexity and thus improving cost-efficiency), since none of the app-inst:s needs to know whether or at which core itself or any other app-inst is executing within the system 1 at any given time. Instead of relying on knowledge of the their respective previous, current (if any at any given time) or future execution cores by either the app-task instances or any system software, the architecture enables flexibly running any instance of any app-task at any core of the processing systems 300 that they are hosted on.

FIG. 9 shows, according to an embodiment of the invention, at a more detail level, a portion of the logic system 800 (see FIGS. 5 and 8 for context) for providing write access and read access control from the cores of the system 500 to the memories 950 specific to their presently assigned execution app-inst:s. The discussion below details an illustrative example embodiment of this aspect of the invention.

The XC 830 comprises a set of app-inst specific mux:s 910, each of which selects the write and read control access bus from the set 810 identified 550 to it for write direction access 940 to its associated app-inst specific segment 950 at the memory array 850. Each such app-inst specific mux 910 makes these selections based on control 550 from the controller 540 that identifies the core (if any) presently assigned to process its associated app-inst.

At digital logic design level, the write access (incl. read control) bus instance within the set 810 from the core ID #y (y is an integer between 0 and Y−1) is connected to the data input #y of each mux 910 of XC 830, so that the identification 550 of the appropriate source core ID# by the controller to a given mux 910 causes the XC 830 to connect the write and read control buses 810 from the core array 515 to the proper app-inst specific segments 950 within the memory 850. The controller 540 uses information from an application instance ID# addressed look-up-table per Table 4 format (shown later in this specification, under heading "Summary of process flow and information formats . . . ') in supplying the present processing core (if any) identifications 550 to the application instance specific mux:s 910 of XC 830 (the info flow 550 also includes a bit indicating whether a given app-inst was selected for execution at a given time—if not this active/inactive app-inst indicator bit causes the muxes 910 to disable write access to such app-inst's memory 950).

In addition to write data, address and enable (and any other relevant write access signals), the buses 810 and 940 include the read access control signals including the read address to memory 950, from their source cores to their presently assigned processing app-inst:s' memory segments 950, to direct read access from the cores of the array 515 to the memory array 850, which function is illustrated in FIG. 10.

FIG. 10 shows, according to an embodiment of the invention, at a greater level of detail a portion of the logic system per FIG. 8 for connecting to each given processing core within a system 500 (FIG. 5) the read data bus from the memory 950 specific to the app-inst assigned to any given core at any given time. The discussion below details an illustrative example embodiment of this aspect of the invention.

The XC 870 (see FIG. 8 for context) comprises core specific mux:s 1020, each of which selects the read data bus (from set 1010) of the app-inst presently identified 560 for processing by the core associated with a given mux 1020 for connection 880 to that core 520.

Similar to the digital logic level description of the mux 910 (in connection to FIG. 9), the logic implementation for functionality illustrated in FIG. 10, is such that the read data bus instance (from set 1010) associated with application instance ID #m (m is an integer between 0 and M−1) is connected to the data input #m of each mux 1020 instance, so that the identification (by the controller 540) of the active application instance ID #560 for each of these core specific mux:s 1020 of XC 870 causes the XC 870 to connect each given core 520 of the array 515 in read direction to the memory segment 950 (at memory array 850) that is associated with its indicated 560 active app-inst. The controller 540 uses information from a core ID# addressed look-up-table per Table 5 format (shown in later in this specification under the heading "Summary of process flow and information formats . . . ") in supplying the active application instance identifications 560 to the core specific mux:s 1020 of XC 870.

Module-Level Implementation Specifications for the Application Instance to Core Placement Process:

The steps of the process 700 (FIG. 7), according to an embodiment of the invention, are described in the following. The process 700 is implemented by hardware logic in the controller module 540 of a processor 500 per FIG. 5. Similar processes 700 are run (independently) for each of the processing stages 300 of a given system 1.

Objectives for the core allocation algorithm 710 include maximizing the processor 500 core utilization (i.e., generally minimizing, and so long as there are ready app-inst:s, eliminating core idling), while ensuring that each application gets at least up to its entitled (e.g. a contract based minimum) share of the processor 500 core capacity whenever it has processing load to utilize such amount of cores. Each application configured for a given manycore processor 500 is specified its entitled quota 717 of the cores, at least up to which quantity of cores it is to be allocated whenever it is able to execute on such number of cores in parallel; sum of the applications' core entitlements (CEs) 717 is not to exceed the total number of core slots in the given processor 500. Each application program on the processor 500 gets from each run of the algorithm 710:

(1) at least the lesser of its (a) CE 717 and (b) Core Demand Figure (CDF) 530 worth of the cores (and in case (a) and (b) are equal, the 'lesser' shall mean either of them, e.g. (a)); plus (2) as much beyond that to match its CDF as is possible without violating condition (1) for any application on the processor 500; plus (3) the application's even division share of any cores remaining unallocated after conditions (1) and (2) are satisfied for all applications 610 sharing the processor 500.

The algorithm 710 allocating cores 520 to application programs 620 runs as follows:

(i) First, any CDFs 530 by all application programs up to their CE 717 of the cores within the array 515 are met. E.g., if a given program #P had its CDF worth zero cores and entitlement for four cores, it will be allocated zero cores by this step (i). As another example, if a given program #Q had its CDF worth five cores and entitlement for one core, it will be allocated one core by this stage of the algorithm 710. To ensure that each app-task will be able at least communicate with other tasks of its application at some defined minimum frequency, the step (i) of the algorithm 710 allocates for each application program, regardless of the CDFs, at least one core once in a specified number (e.g. sixteen) of process 700 runs.

(ii) Following step (i), any processing cores remaining unallocated are allocated, one core per program at a time, among the application programs whose demand 530 for processing cores had not been met by the amounts of cores so far allocated to them by preceding iterations of this step (ii) within the given run of the algorithm 710. For instance, if after step (i) there remained eight unallocated cores and the sum of unmet portions of the program CDFs was six cores, the program #Q, based on the results of step (i) per above, will be allocated four more cores by this step (ii) to match its CDF.

(iii) Following step (ii), any processing cores still remaining unallocated are allocated among the application programs evenly, one core per program at time, until all the cores of the array 515 are allocated among the set of programs 610. Continuing the example case from steps (i) and (ii) above, this step (iii) will allocate the remaining two cores to certain two of the programs (one for each). Programs with zero existing allocated cores, e.g. program #P from step (i), are prioritized in allocating the remaining cores at the step (iii) stage of the algorithm 710.

Moreover, the iterations of steps (ii) and (iii) per above are started from a revolving application program ID#s within the set 610, e.g. so that the application ID# to be served first by these iterations is incremented by one (and returning to ID #0 after reaching the highest application ID#) for each successive run of the process 700 and the algorithm 710 as part of it. Furthermore, the revolving start app ID#s for the steps (ii) and (iii) are kept at offset from each other equal to the number of app:s sharing the processor divided by two.

Accordingly, all cores 520 of the array 515 are allocated on each run of the related algorithms 700 according to applications processing load variations while honoring their contractual entitlements. The allocating of the array of cores 515 by the algorithm 710 is done in order to minimize the greatest amount of unmet demands for cores (i.e. greatest difference between the CDF and allocated number of cores for any given application 620) among the set of programs 610, while ensuring that any given program gets at least its entitled share of the processing cores following such runs of the algorithm for which it demanded 530 at least such entitled share 717 of the cores.

To study further details of the process 700, let us consider the cores of the processor 500 to be identified as core #0 through core #(Y−1). For simplicity and clarity of the description, we will from hereon consider an example processor 500 under study with a relatively small number Y of sixteen cores. We further assume here a scenario of relatively small number of also sixteen application programs configured to run on that processor 500, with these applications identified for the purpose of the description herein alphabetically, as application #A through application #P. Note however that the architecture presents no actual limits for the number of cores, applications or their instances for a given processor 500. For example, instances of processor 500 can be configured a number of applications that is lesser or greater than (as well as equal to) the number of cores.

Following the allocation 710 of the set of cores 515 among the applications 610, for each active application on the processor 500 (that were allocated one or more cores by the latest run of the core allocation algorithm 710), the individual ready-to-execute app-inst:s 640 are selected 720 and mapped 730 to the number of cores allocated to the given application. One schedulable 640 app-inst is assigned per one core 520 by each run of the process 700.

The app-inst selection 720 step of the process 700 produces, for each given application of the set 610, lists 725 of to-be-executing app-inst:s to be mapped 730 to the subset of cores of the array 515. Note that, as part of the periodic process 700, the selection 720 of to-be-executing app-inst for any given active application (such that was allocated 710 at least one core) is done, in addition to following of a chance in allocation 710 of cores among applications, also following a change in app-inst priority list 535 of the given application, including when not in connection to reallocation 710 of cores among the applications. The active app-inst to core mapping 730 is done logically individually for each application, however keeping track of which cores are available for any given application (by first assigning for each application their respective subsets of cores among the array 515 and then running the mapping 730 in parallel for each application that has new app-inst:s to be assigned to their execution cores).

The app-inst to core mapping algorithm 730 for any application begins by keeping any continuing app-inst:s, i.e., app-inst:s selected to run on the array 515 both before and after the present app-inst switchovers, mapped to their current cores also on the next allocation period. After that rule is met, any newly selected app-inst:s for the application are mapped to available cores. Specifically, assuming that a given application was allocated k (a positive integer) cores beyond those used by its continuing app-inst:s, k highest priority ready but not-yet-mapped app-inst:s of the application are mapped to k next available (i.e. not-yet-assigned) cores within the array 515 allocated to the application. In case that any given application had less than k ready but not-yet-mapped app-inst:s, the highest priority other (e.g. waiting, not ready) app-inst:s are mapped to the remaining available cores among the number cores allocated to the given application; these other app-inst:s can thus directly begin executing on their assigned cores once they become ready. The placing of newly selected app-inst:s, i.e., selected instances of applications beyond the app-inst:s continuing over the switchover transition time, is done by mapping such yet-to-be-mapped app-inst:s in incrementing app-inst ID# order to available cores in incrementing core ID# order.

Summary of Process Flow and Information Formats Produced and Consumed by Main Stages of the App-Inst to Core Mapping Process:

According to an embodiment of the invention, the production of updated mappings 560, 550 between selected app-inst:s 725 and the processing core slots 520 of the processor 500 by the process 700 (FIG. 7, implemented by controller 540 in FIG. 5) from the Core Demand Figures (CDFs) 530 and app-inst priority lists 535 of the applications 620 (FIG. 6), as detailed above with module level implementation examples, proceeds through the following stages and intermediate results (in reference to FIG. 7):

The RX logic 400 produces for each application 620 its CDF 530, e.g. an integer between 0 and the number of cores within the array 515 expressing how many concurrently executable app-inst:s 640 the application presently has ready to execute. The information format 530, as used by the core allocation phase of the process 700, is such that logic with the core allocation module 710 repeatedly samples the application CDF bits written 430 to it by the RX logic 400 (FIGS. 4, 5 and 7) and, based on such samples, forms an application ID-indexed table (per Table 1 below) as a 'snapshot' of the application CDFs as an input for next exercising of the process 700. An example of such format of the information 530 is provided in Table 1 below—note however that in the hardware logic implementation, the application ID index, e.g. for range A through P, is represented by a digital number, e.g., in range 0 through 15, and as such, the application ID # serves as the index for the CDF entries of this array, eliminating the need to actually store any representation of the application ID for the table providing information 530:

TABLE 1

| Application ID index | CDF value |
| --- | --- |
| A | 0 |
| B | 12 |
| C | 3 |
| ... | ... |

TABLE 1-continued

| Application ID index | CDF value |
| --- | --- |
| P | 1 |

Regarding Table 1 above, note that the values of entries shown are simply examples of possible values of some of the application CDFs, and that the CDF values of the applications can change arbitrarily for each new run of the process 700 and its algorithm 710 using snapshots of the CDFs.

Based (in part) on the application ID# indexed CDF array 530 per Table 1 above, the core allocation algorithm 710 of the process 700 produces another similarly formatted application ID indexed table, whose entries 715 at this stage are the number of cores allocated to each application on the processor 500, as shown in Table 2 below:

TABLE 2

| Application ID index | Number of cores allocated |
| --- | --- |
| A | 0 |
| B | 6 |
| C | 3 |
| ... | ... |
| P | 1 |

Regarding Table 2 above, note again that the values of entries shown are simply examples of possible number of cores allocated to some of the applications after a given run on the algorithm 710, as well as that in hardware logic this array 715 can be simply the numbers of cores allocated per application, as the application ID# for any given entry of this array is given by the index # of the given entry in the array 715.

The app-inst selection sub-process 720, done individually for each application of the set 610, uses as its inputs the per-application core allocations 715 per Table 2 above, as well as priority ordered lists 535 of ready app-inst IDs of any given application. Each such application specific list 535 has the (descending) app-inst priority level as its index, and, as a values stored at each such indexed element, the intra-application scope instance ID#, plus, for processors 500 supporting reconfigurable core slot, an indication of the target core type (e.g. CPU, DSP, GPU or a specified ASP) demanded by the app-inst, as shown in the example of Table 3 below:

TABLE 3

| App-inst priority index # -- application internal (lower index value signifies more urgent app-inst) | App-inst ID # (identifies the app-inst-specific memory 950 within the memory array 850) | Target core type (e.g., 0 denotes CPU, 1 denotes DSP, and 2 denotes GPU, etc.) |
| --- | --- | --- |
| 0 | 0 | 0 |
| 1 | 8 | 2 |
| 2 | 5 | 2 |
| ... | ... | |
| 15 | 2 | 1 |

Notes regarding implicit indexing and non-specific examples used for values per Tables 1-2 apply also for Table 3.

The RX logic 400 writes 430 for each application 620 of the set 610 the intra-app instance priority list 535 per Table 3 to controller 540, to be used as an input for the active app-inst selection sub-process 720, which produces per-application listings 725 of selected app-inst:s, along with their corresponding target core types where applicable. Based at least in part on the application specific active app-inst listings 725, the core to app-inst assignment algorithm module 730 produces a core ID# indexed array 550 indexed with the application and instance IDs, and provides as its contents the assigned processing core ID (if any), per Table 4 below:

TABLE 4

| Application ID -- MSBs of index | Instance ID (within the application of column to the left) -- LSBs of index | Processing core ID (value 'Y' here indicates that the given app-inst is not presently selected for execution at any of the cores) |
|---|---|---|
| A | 0 | 0 |
| A | 1 | Y |
| ... | ... | |
| A | 15 | 3 |
| B | 0 | 1 |
| B | 1 | Y |
| ... | ... | |
| B | 15 | 7 |
| C | 0 | 2 |
| ... | ... | ... |
| P | 0 | 15 |
| ... | ... | |
| P | 15 | Y |

Finally, by inverting the roles of index and contents from Table 4, an array 560 expressing to which app-inst ID# each given core of the fabric 510 got assigned, per Table 5 below, is formed. Specifically, Table 5 is formed by using as its index the contents of Table 4 i.e. the core ID numbers (other than those marked 'Y'), and as its contents the app-inst ID index from Table 4 corresponding each core ID# (along with, where applicable, the core type demanded by the given app-inst, with the core type for any given selected app-inst being denoted as part of the information flow 725 (FIG. 7) produced from a data array per Table 3). This format for the app-inst to core mapping info 560 is illustrated in the example below:

TABLE 5

| Core ID index | Application ID | Instance ID (within the application of column to the left) | Core type (e.g., 0 denotes CPU, 1 denotes DSP, and 2 denotes GPU, etc.) |
|---|---|---|---|
| 0 | P | 0 | 0 |
| 1 | B | 0 | 0 |
| 2 | B | 8 | 2 |
| ... | ... | ... | ... |
| 15 | N | 1 | 1 |

Regarding Tables 4 and 5 above, note that the symbolic application IDs (A through P) used here for clarity will in digital logic implementation map into numeric representations, e.g. in the range from 0 through 15. Also, the notes per Tables 1-3 above regarding the implicit indexing (i.e., core ID for any given app-inst ID entry is given by the index of the given entry, eliminating the need to store the core IDs in this array) apply for the logic implementation of Tables 4 and 5 as well.

In hardware logic implementation the application and the intra-app-inst IDs of Table 5 are bitfields of same digital entry at any given index of the array 560; the application ID bits are the most significant bits (MSBs) and the app-inst ID bits the least significant (LSBs), and together these identify the active app-inst's memory 950 in the memory array 850 (for the core with ID# equaling the given index to app-inst ID# array per Table 5).

By comparing Tables 4 and 5 above, it is seen that the information contents at Table 4 are the same as at Table 5; the difference in purposes between them is that while Table 5 gives for any core slot 520 its active app-inst ID #560 to process (along with the demanded core type), Table 4 gives for any given app-inst its processing core 550 (if any at a given time). As seen from FIGS. 8-10, the Table 5 outputs are used to configure the core specific mux:s 1020 at XC 870, while the Table 4 outputs are used to configure the app-inst specific mux:s 910 at XC 830.

Note further that, according to the process 700, when the app-inst to core placement module 730 gets an updated list of selected app-inst:s 725 for one or more applications 620 (following a change in either or both of core to application allocations 715 or app-inst priority lists 535 of one or more applications), it will be able to identify from Tables 4 and 5 the following:

I. The set of activating, to-be-mapped, app-inst:s, i.e., app-inst:s within lists 725 not mapped to any core by the previous run of the placement algorithm 730. This set I is produced by taking those app-inst:s from the updated selected app-inst lists 725, per Table 4 format, whose core ID# was 'Y' (indicating app-inst not active) in the latest Table 4;

II. The set of deactivating app-inst:s, i.e., app-inst:s that were included in the previous, but not in the latest, selected app-inst lists 725. This set II is produced by taking those app-inst:s from the latest Table 4 whose core ID# was not 'Y' (indicating app-inst active) but that were not included in the updated selected app-inst lists 725; and III. The set of available cores, i.e., cores 520 which in the latest Table 5 were assigned to the set of deactivating app-inst:s (set II above).

The placer module 730 uses the above info to map the active app-inst:s to cores of the array in a manner that keeps the continuing app-inst:s executing on their present cores, thereby maximizing utilization of the core array 515 for processing the user applications 620. Specifically, the placement algorithm 730 maps the individual app-inst:s 640 within the set I of activating app-inst:s in their increasing app-inst ID# order for processing at core instances within the set III of available cores in their increasing core ID# order.

Moreover, regarding placement of activating app-inst:s (set I as discussed above), the placement algorithm 730 seeks to minimize the amount of core slots for which the activating app-inst demands a different execution core type than the deactivating app-inst did. I.e., the placer will, to the extent possible, place activating app-inst:s to such core slots where the deactivating app-inst had the same execution core type. E.g., activating app-inst demanding the DSP type execution core will be placed to the core slots where the deactivating app-inst:s also had run on DSP type cores. This sub-step in placing the activation app-inst:s to their target core slots uses as one of its inputs the new and preceding versions of (the core slot ID indexed) app-inst ID and core type arrays per Table 5, to allow matching activating app-inst:s and the available core slots according to the core type.

Architectural Cost-Efficiency Benefits

Advantages of the system capacity utilization and application performance optimization techniques described in the foregoing include:

Increased user's utility, measured as demanded-and-allocated cores per unit cost, as well as, in most cases, allocated cores per unit cost Increased revenue generating capability for the service provider from CE based billables, per unit cost for a system 1. This enables increasing the service provider's operating cash flows generated or supported by a system 1 of certain cost level. Also, compared to a given computing service provider's revenue level, this reduces the provider's cost of revenue, allowing the provider to offer more competitive contract pricing, by passing on at least a portion of the savings to the customers (also referred to as users) running programs 620 on the system 1, thereby further increasing the customer's utility of the computing service subscribed to (in terms of compute capacity received when needed, specifically, number of cores allocated and utilized for parallel program execution) per unit cost of the service.

At a more technical level, the dynamic parallel processing techniques per FIGS. 1-10 allow cost-efficiently sharing a manycore based computing hardware among a number of application software programs, each executing on a time variable, dynamically optimized number of cores, maximizing the whole system data processing throughput, while providing deterministic minimum system processing capacity access levels for each of the applications configured to run on the given system.

Moreover, the hardware operating system 540 and the processing fabric memory access subsystem 800 (described in relation to FIGS. 5-10) enables running any application task on a processor 500 at any of its cores at any given time, in a restriction free manner, with minimized overhead, including minimized core idle times, and without a need for a collective operating system software during the system runtime operation (i.e., after its startup or maintenance configuration periods) to handle matters such as monitoring, prioritizing, scheduling, placing and policing user applications and their tasks. The hardware OS 540 fabric memory access subsystem 800 achieve this optimally flexible use of the cores of the system in a (both software and hardware) implementation efficient manner (including logic and wiring resource efficiently), without a need for core to core level cross-connectivity, as well as memory efficiently without a need for the cores to hold more than one app-task-inst's processing state (if any needed) within their memories at a time. Instead of needing core to core cross-connects for inter-task communications and/or memory image transfers, the memory access subsystem 800 achieves their purposes by more efficiently (in terms of system resources needed) through a set of mux:s connecting the cores with appropriate app-task-inst specific memory segments at the fabric memory arrays. The system 1 architecture enables application tasks running on any core of any processing stage of the system to communicate with any other task of the given application without requiring any such communicating tasks to know whether and where (at which core) any other task is running at any given time. The system thus provides architecturally improved scalability for parallel data processing systems as the number of cores, applications and tasks within applications grows.

To summarize, the dynamic parallel execution environment provided by the system 1 enables each application program to dynamically get a maximized number of cores that it can utilize concurrently so long as such demand-driven core allocation allows all applications on the system to get at least up to their entitled number of cores whenever their processing load actually so demands.

The presented architecture moreover provides straightforward IO as well as inter-app-task communications for the set of application (server) programs configured to run on the system per FIG. 1. The external world is typically exposed, for any given one of such applications, with a virtual singular app-instance instance (proxy), while the system supports executing concurrently any number of instances of any given app-task on the core fabrics 510 of the processing stages 300 (within the limit of core slot capacity of the system).

To achieve this, the architecture involves an entry-stage ("master-stage") processing system (typically with the master tasks of the set of applications 610 hosted on it), which distribute the received data processing workloads for worker-stage processing systems, which host the rest of the tasks of the application programs, with the exception of the parts (tasks) of the program hosted on the exit stage processing system, which typically assembles the processing results from the worker stage tasks for transmission to the appropriate external parties. External users and applications communicates directly with the entry and (in their receive direction, exit) stage processing system i.e. with the master tasks of each application, and these master tasks pass on data load units (requests/messages/files/steams) for processing by the worker tasks on the worker-stage processing systems, with each such data unit identified by their app-task instance ID#s, and with the app ID# bits inserted by controllers 540, to ensure inter-task communications stay within their authorized scope, by default within the local application. There may be multiple instances of any given (locally hosted) app-task executing simultaneously on both the entry/exit as well as worker stage manycore processors, to accommodate variations in the types and volumes of the processing workloads at any given time, both between and within the applications 620 (FIG. 6).

The received and buffered data loads to be processed drive, at least in part, the dynamic allocating and assignment of cores among the app-inst:s at any given stage of processing by the multi-stage manycore processing system, in order to maximize the total (value adding, e.g. revenue-generating) on-time IO data processing throughput of the system across all the applications on the system.

The architecture provides a straightforward way for the hosted applications to access and exchange their IO and inter-task data without concern of through which input/output ports any given IO data units may have been received or are to be transmitted at any given stage of processing, or whether or at which cores of their host processors any given source or destination app-task instances may be executing at any given time. External parties (e.g. client programs) interacting with the (server) application programs hosted on the system 1 are likewise able to transact with such applications through a virtual static contact point, i.e., the (initially non-specific, and subsequently specifiable instance of the) master task of any given application, while within the system the applications are dynamically parallelized and/or pipelined, with their app-task instances able to activate, deactivate and be located without restrictions.

The dynamic parallel program execution techniques thus enable dynamically optimizing the allocation of parallel processing capacity among a number of concurrently running application software programs, in a manner that is adaptive to realtime processing loads of the applications, with minimized system (hardware and software) overhead costs.

Furthermore, the system per FIGS. 1-10 and related descriptions enable maximizing the overall utility computing cost-efficiency. Accordingly, benefits of the application load adaptive, minimized overhead multi-user parallel data processing system include:

- Practically all the application processing time of all the cores across the system is made available to the user applications, as there is no need for a common system software to run on the system (e.g. to perform on the cores traditional system software tasks such as time tick processing, serving interrupts, scheduling, placing applications and their tasks to the cores, billing, policing, etc.).
- The application programs do not experience any considerable delays in ever waiting access to their (e.g. contract-based) entitled share of the system processing capacity, as any number of the processing applications configured for the system can run on the system concurrently, with a dynamically optimized number of parallel (incl. pipelined) cores allocated per an application.
- The allocation of the processing time across all the cores of the system among the application programs sharing the system is adaptive to realtime processing loads of these applications.
- There is inherent security (including, where desired, isolation) between the individual processing applications in the system, as each application resides in its dedicated (logical) segments of the system memories, and can safely use the shared processing system effectively as if it was the sole application running on it. This hardware based security among the application programs and tasks sharing the manycore data processing system per FIGS. 1-10 further facilitates more straightforward, cost-efficient and faster development and testing of applications and tasks to run on such systems, as undesired interactions between the different user application programs can be disabled already at the system hardware resource access level.

The dynamic parallel execution techniques thus enable maximizing data processing throughput per unit cost across all the user applications configured to run on the shared multi-stage manycore processing system.

The presented manycore processor architecture with hardware based scheduling and context switching accordingly ensures that any given application gets at least its entitled share of the dynamically shared parallel processing system capacity whenever the given application actually is able to utilize at least its entitled quota of system capacity, and as much processing capacity beyond its entitled quota as is possible without blocking the access to the entitled and fair share of the processing capacity by any other application program that is actually able at that time to utilize such capacity that it is entitled to. For instance, the dynamic parallel execution architecture presented thus enables any given user application to get access to the full processing capacity of the manycore system whenever the given application is the sole application offering processing load for the shared manycore system. In effect, the techniques per FIGS. 1-10 provide for each user application with an assured access to its contract based percentage (e.g. 10%) of the manycore system throughput capacity, plus most of the time much greater share, even 100%, of the processing system capacity, with the cost base for any given user application being largely defined by only its committed access percentage worth of the shared manycore processing system costs.

The references [1], [2], [3], [4], [5], [6], [7], [8] and [9] provide further reference specifications and use cases for aspects and embodiments of the invented techniques. Among other such aspects disclosed in these references, the reference [4], at its paragraphs 69-81 and its FIG. 11, provides descriptions for a billing subsystem 1100 (see FIG. 7 herein for context) of a controller 540 of a manycore processing system 500 according to an embodiment of the invention.

This description and drawings are included to illustrate architecture and operation of practical and illustrative example embodiments of the invention, but are not meant to limit the scope of the invention. For instance, even though the description does specify certain system parameters to certain types and values, persons of skill in the art will realize, in view of this description, that any design utilizing the architectural or operational principles of the disclosed systems and methods, with any set of practical types and values for the system parameters, is within the scope of the invention. For instance, in view of this description, persons of skill in the art will understand that the disclosed architecture sets no actual limit for the number of cores in a given system, or for the maximum number of applications or tasks to execute concurrently. Moreover, the system elements and process steps, though shown as distinct to clarify the illustration and the description, can in various embodiments be merged or combined with other elements, or further subdivided and rearranged, etc., without departing from the spirit and scope of the invention. It will also be obvious to implement the systems and methods disclosed herein using various combinations of software and hardware. Finally, persons of skill in the art will realize that various embodiments of the invention can use different nomenclature and terminology to describe the system elements, process phases etc. technical concepts in their respective implementations. Generally, from this description many variants will be understood by one skilled in the art that are yet encompassed by the spirit and scope of the invention.

What is claimed is:

1. A system comprising a plurality of subsystems, implemented on at least one of hardware logic and software logic executing on a plurality of processors, for computing resource management, the system comprising:

a first subsystem configured to allocate an array of units of computing capacity among instances of a set of programs, each program of the set of programs comprising a respective plurality of instances, wherein the allocating is based at least in part on respective volumes of processing data for each program of the set of programs, and the allocating results in a unique subset of the array of units of computing capacity allocated to each program of the set of programs;

a second subsystem configured to, for each program of the set of programs, assess a relative readiness for execution among the plurality of instances of the respective program, wherein the relative readiness is assessed based at least in part on respective volumes of processing data available to each instance of the plurality of instances; and a third subsystem configured to select, for each program of the set of programs, a highest priority subset of instances of the plurality of instances of the respective program for execution on the array of units of computing capacity according to a number of units of the unique subset of the array of units allocated to the respective program, wherein the highest priority subset of instances is selected based at least in part on the relative readiness for execution, and selecting results in a plurality of selected instances; wherein the plurality of selected instances includes
one or more assigned instances currently executing on a given unit of the array of units of computing capacity, and
one or more unassigned instances currently unassigned to any unit of the array of units of computing capacity, wherein
selecting the highest priority subset of instances comprises, for at least one program of the set of programs, prioritizing an unassigned instance of the at least one program over an assigned instance of a given program of the set of programs currently executing on a given unit of the array of units of processing capacity, resulting in preemption of the assigned instance, wherein the prioritizing is based at least in part on newly available data to the at least one program.

2. The system of claim 1, wherein the assessing comprises ranking the plurality of instances of the respective program into an execution priority order.

3. The system of claim 1, wherein, for a portion of the set of programs, the array of units is allocated by the first subsystem based further in part on an entitlement for one or more units of computing capacity held by the respective program.

4. The system of claim 3, wherein allocating the array of units based in part on the entitlement comprises ensuring the entitlement for each of the portion of the set of programs is met prior to meeting additional demand by the set of programs, wherein the additional demand is based at least in part based on the respective volume of processing data of each respective program of the set of programs.

5. The system of claim 1, wherein the allocating comprises:
quantifying the respective volume of processing data queued to each program of one or more programs of the set of programs as a count of processing data units; and
allocating one or more units of the array of units of computing capacity to each program of the one or more programs based at least in part on the count of processing data units.

6. The system of claim 1, wherein the volumes of processing data are available at a plurality of input data buffers, each input data buffer queuing data for a respective program of the set of programs.

7. The system of claim 1, wherein allocating comprises allocating the array of units of computing capacity based at least in part on a respective processing quota of each application program of at least a portion of the plurality of application programs.

8. The system of claim 1, further comprising a fourth subsystem configured to assign, for each program of the plurality of programs, each unit of the array of units of computing capacity allocated to the respective program to a different instance of the respective program, wherein
the assigning results in assignment of the plurality of selected instances of the respective program to the unique subset of the array of units allocated to the respective program.

9. The system of claim 1, wherein the allocating, the selecting and the assessing are performed periodically according to a core allocation period.

10. The system of claim 9, wherein periodically allocating comprises periodically adjusting allocations based at least in part on changes in respective volumes of data associated with each program of the set of programs.

11. The system of claim 1, wherein the array of units of computing capacity comprise an array of virtual cores.

12. The system of claim 1 wherein the array of units of computing capacity comprises one of a) at least two types of units and b) units of a reconfigurable type.

13. A method for computing resource management, implemented by a controller comprising software logic executing on processors and/or hardware logic, the method comprising:
allocating, by the controller, an array of units of computing capacity among instances of a set of programs, each program of the set of programs comprising a respective plurality of instances, wherein
the allocating is based at least in part on respective volumes of processing data for each program of the set of programs, and
the allocating results in a unique subset of the array of units of computing capacity allocated to each program of the set of programs;
assessing, by the controller, a relative readiness for execution among the plurality of instances of the respective program, wherein
the relative readiness is assessed based at least in part on respective volumes of processing data available to each instance of the plurality of instances; and
selecting, by the controller for each program of the set of programs, a highest priority subset of instances of the plurality of instances of the respective program for execution on the array of units of computing capacity according to a number of units of the unique subset of the array of units allocated to the respective program, wherein
the highest priority subset of instances is selected based at least in part on the relative readiness for execution, and
selecting results in a plurality of selected instances; wherein
the plurality of selected instances includes
one or more assigned instances currently executing on a given unit of the array of units of computing capacity, and
one or more unassigned instances currently unassigned to any unit of the array of units of computing capacity, wherein
selecting the highest priority subset of instances comprises, for at least one program of the set of programs, prioritizing an unassigned instance of the at least one program over an assigned instance of a given program of the set of programs currently executing on a given unit of the array of units of processing capacity, resulting in preemption of the assigned instance, wherein the prioritizing is based at least in part on newly available data to the at least one program.

14. The method of claim 13, wherein, for a portion of the set of programs, the array of units is allocated based further in part on an entitlement for one or more units of computing capacity held by the respective program.

15. The method of claim 14, wherein allocating the array of units based in part on the entitlement comprises ensuring the entitlement for each of the portion of the set of programs is met prior to meeting additional demand by the set of programs, wherein the additional demand is based at least in part on the respective volume of processing data of each respective program of the set of programs.

16. The method of claim 13, wherein the volumes of processing data are available at a plurality of input data buffers, each input data buffer queuing data for a respective program of the set of programs.

17. The method of claim 13, wherein allocating comprises allocating the array of units of computing capacity based at least in part on a respective processing quota of each application program of at least a portion of the plurality of application programs.

18. The method of claim 13, further comprising assigning, by the controller, for each program of the plurality of programs, each unit of the array of units of computing capacity allocated to the respective program to a different instance of the respective program, wherein
    the assigning results in assignment of the plurality of selected instances of the respective program to the unique subset of the array of units allocated to the respective program.

19. The method of claim 13, wherein the allocating, the selecting and the assessing are performed periodically according to a core allocation period.

20. The method of claim 13, wherein the assessing comprises ranking the plurality of instances of the respective program into an execution priority order.

21. The method of claim 13, wherein the allocating comprises:
    quantifying the respective volume of processing data queued to each program of one or more programs of the set of programs as a count of processing data units; and
    allocating one or more units of the array of units of computing capacity to each program of the one or more programs based at least in part on the count of processing data units.

\* \* \* \* \*